United States Patent [19]

Yamanaka et al.

[11] Patent Number: 5,619,495

[45] Date of Patent: Apr. 8, 1997

[54] CELL SWITCHING APPARATUS AND A CELL SWITCHING SYSTEM

[75] Inventors: Hideaki Yamanaka; Hirotaka Saito; Munenori Tsuzuki; Yasuhito Sasaki; Hirotoshi Yamada; Kazuyoshi Oshima, all of Kanagawa, Japan

[73] Assignee: Mitsubishi Denki Kabushiki Kaisha, Tokyo, Japan

[21] Appl. No.: 517,169

[22] Filed: Aug. 21, 1995

[30] Foreign Application Priority Data

Sep. 2, 1994 [JP] Japan ................................. 6-210240

[51] Int. Cl.$^6$ ................................................. H04Q 11/04
[52] U.S. Cl. ......................... 370/413; 370/395; 370/427
[58] Field of Search ................................. 370/58.2, 60.1, 370/64, 68.1, 60, 94.1

[56] References Cited

FOREIGN PATENT DOCUMENTS

| | | |
|---|---|---|
| 63-64439 | 3/1988 | Japan . |
| 63-67848 | 3/1988 | Japan . |
| 1-29144 | 1/1989 | Japan . |
| 1-29145 | 1/1989 | Japan . |
| 2-51924 | 2/1990 | Japan . |
| 2-303245 | 2/1990 | Japan . |
| 3-205937 | 9/1991 | Japan . |
| 5-199574 | 8/1993 | Japan . |
| 6-6370 | 1/1994 | Japan . |
| 6-120973 | 4/1994 | Japan . |

OTHER PUBLICATIONS

Jean–Pierre Coudreuse & Michel Servel "Prelude:An Asynchronous Time–Division Switched Network" 1987 IEEE pp. 0769–0773.

Y. Sakurai, et al. "Large Scale ATM Multi–Stage Switching Network with Shared Buffer Memory Switches" International Switching Symposium 1990 pp. 121–126.

K. Oshima, et al. "A New ATM Switch Architecture Bsed on STS–Type Shared Buffering and Its LSI Implementation" IEICE 1992 Oct., pp. 359–363.

William Stallings, "Data and Computer Communications", 2nd ed., Macmillan Pub. Co., pp. 215–218, 1985.

Primary Examiner—Douglas W. Olms
Assistant Examiner—Matthew C. Phillips
Attorney, Agent, or Firm—Wolf, Greenfield & Sacks, P.C.

[57] ABSTRACT

This invention provides a cell switching apparatus having buffer memories in which accesses of a plurality off cells can be implemented in one-cell time. The cell switching apparatus arranges a plurality of buffer memories, in which accesses of a plurality of cells can be performed, in parallel, and schedules a score table so that the writing and reading out operations may not overlap. Accordingly, the incoming lines may be increased lip to (the number of incoming lines n)=(the number of buffer memories p−1)×(the number of outgoing lines m) without increasing the access speed of the buffer memories.

24 Claims, 38 Drawing Sheets

Fig.3

| | | 1-cell period with 8 time accesses | | | | | | | |
|---|---|---|---|---|---|---|---|---|---|
| SBM#1 | $W_1$ | $W_5$ | $R_3$ | $W_{13}$ | $W_{17}$ | $W_{21}$ | $W_{25}$ | $W_{29}$ | |
| SBM#2 | $W_2$ | $W_6$ | $W_9$ | $R_4$ | $W_{18}$ | $R_6$ | $W_{26}$ | $W_{30}$ | |
| SBM#3 | $W_3$ | $W_7$ | $W_{10}$ | $W_{14}$ | $R_5$ | $W_{22}$ | $W_{27}$ | $W_{31}$ | |
| SBM#4 | $R_1$ | $W_8$ | $W_{11}$ | $W_{15}$ | $W_{19}$ | $W_{23}$ | $W_{28}$ | $R_8$ | |
| SBM#5 | $W_4$ | $R_2$ | $W_{12}$ | $W_{16}$ | $W_{20}$ | $W_{24}$ | $R_7$ | $W_{32}$ | |

103 : SCORE TABLE

The first access to the SBMs

The last access to the SBMs

READ OUT AND WRITING CONNECTING TYPE CONTROL

THE NUMBER OF INCOMING LINES n = 32
THE NUMBER OF OUT GOING LINES m
(THE NUMBER OF DIVISIONS x) = 8
THE NUMBER OF BUFFER MEMORIES p = 5
$n \leq (p-1)m$
$32 = (5-1)8$

Fig.4

ADDRESS QUEUE

| | | | |
|---|---|---|---|
| | $R_{21}$ | $R_{11}$ | $R_1$ | $18_1$
| | $R_{22}$ | $R_{12}$ | $R_2$ | $18_2$
| | $R_{23}$ | $R_{13}$ | $R_3$ | $18_3$
| | $R_{24}$ | $R_{14}$ | $R_4$ | $18_4$
| | ⋮ | ⋮ | ⋮ | |
| | $R_{28}$ | $R_{18}$ | $R_8$ | $18_8$

Fig.7

103 : SCORE TABLE 1-cell period with m-time accesses

| | | | | | | | | |
|---|---|---|---|---|---|---|---|---|
| SBM#1 | W₁ | W₅ | R₃ | W₁₃ | W₁₇ | W₂₁ | W₂₅ | W₃₀ |
| SBM#2 | W₂ | W₆ | W₉ | R₄ | W₁₈ | R₆ | W₂₆ | W₃₁ |
| SBM#3 | W₃ | W₇ | W₁₀ | W₁₄ | R₅ | W₂₂ | W₂₇ | W₃₂ |
| ---- | R₁ | W₈ | W₁₁ | W₁₅ | W₁₉ | W₂₃ | W₂₈ | Rₘ |
| SBM#p | W₄ | R₂ | W₁₂ | W₁₆ | W₂₀ | W₂₄ | W₂₉ | Wₙ |

↑ The first access to the SBMs

↑ The last access to the SBMs

READ OUT AND WRITING CONNECTING TYPE CONTROL

THE NUMBER OF INCOMING LINES $n = 32$
THE NUMBER OF OUT GOING LINES $m$ (THE NUMBER OF DIVISIONS $x$) $= 8$
THE NUMBER OF BUFFER MEMORIES $p = 5$
$n \leq (p-1)m$
$32 = (5-1)8$

Fig.10

| | | 1-cell period with 4-time accesses | | | |
|---|---|---|---|---|---|
| SBM# 1 | $R_1$ | $R_2$ | $R_3$ | $R_4$ | $R_5$ |
| SBM# 2 | $W_1$ | $W_5$ | $R_6$ | $W_{12}$ | |
| SBM# 3 | $W_2$ | $W_6$ | $W_9$ | $W_{13}$ | |
| SBM# 4 | $W_3$ | $W_7$ | $W_{10}$ | $R_7$ | |
| SBM# 5 | $W_4$ | $W_8$ | $W_{11}$ | $R_8$ | |

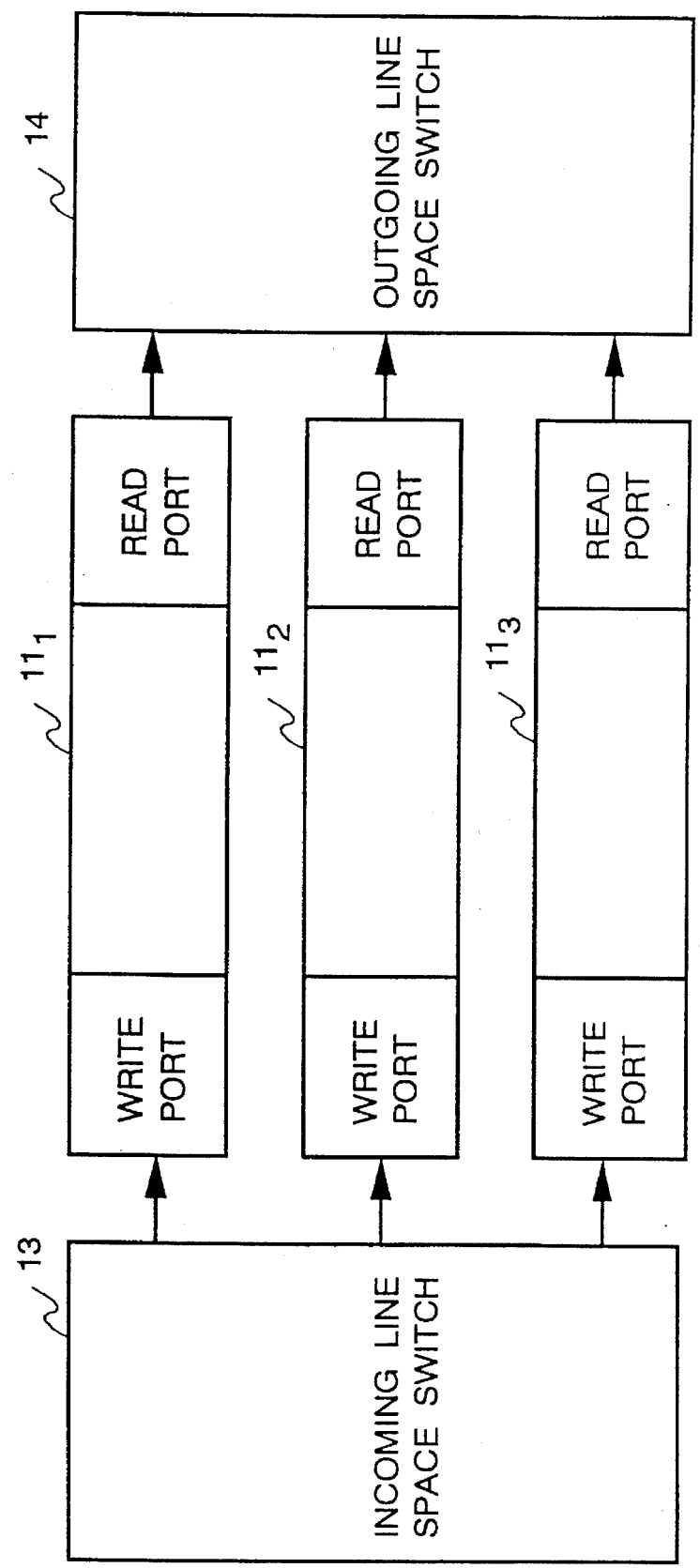

Fig. 14A

FOR READ

|  | | | | | | | | |
|---|---|---|---|---|---|---|---|---|
| SBM #1 | $R_1$ | | | | | | | |
| SBM #2 | | $R_2$ | | | | | | |
| SBM #3 | | | $R_3$ | $R_4$ | $R_5$ | $R_6$ | | |
| SBM #p | | | | | | | | $R_m$ |

1-cell period with m-time accesses — 13a

Fig. 14B

FOR WRITE

|  | | | | | | | | |
|---|---|---|---|---|---|---|---|---|
| SBM #1 | W | W | W | W | W | W | W | W |
| SBM #2 | W | W | W | W | W | W | W | W |
| SBM #3 | W | W | W | W | W | W | W | W |
| SBM #p | W | W | W | W | W | W | W | W |

13b

FOR BUFFER MEMORY 11a

FOR BUFFER MEMORY 11b

FOR BUFFER MEMORY 11c

BUS CONFIGURATION
(CENTRALIZED)

BUS CONFIGURATION
(DECENTRALIZED)

Fig.21

| THE NUMBER OF OUTGOING LINES  m | THE NUMBER OF BUFFER MEMORIES  p | THE MAXIMUM NUMBER OF INCOMING LINES  n=(p−1)m |
|---|---|---|
| 8 | 5 | 32 |
| 8 | 6 | 40 |
| 8 | 7 | 48 |
| 8 | 8 | 56 |
| 8 | 9 | 64 |
| 8 | 10 | 72 |
| ⋮ | ⋮ | ⋮ |

LINE CONCENTRATION CONFIGURATION

8 × 8 SWITCH

16 × 16 SWITCH

LINE CONCENTRATION CONFIGURATION

24 × 24 SWITCH

LINE CONCENTRATION
CONFIGURATION

32 × 16 SWITCH

Fig.25

METHOD OF 32×32 ATM SWITCH CONFIGURATION (F·m=32)

| THE NUMBER OF FUNNEL SWITCHES (F) | 1 | 2 | 4 | 8 | 16 | 32 |
|---|---|---|---|---|---|---|
| THE NUMBER OF OUTGOING LINES PER FUNNEL SWITCH (m) | 32 | 16 | 8 | 4 | 2 | 1 |

Fig.31   RELATED ART

| | TIME SLOTS | 1 | 2 | 3 | 4 | 5 | 6 | 7 | 8 |
|---|---|---|---|---|---|---|---|---|---|
| INCOMING LINE RECEIVING CELL | (A) | O₁ F1 | O₄ F2 | O₁ F3 | O₂ F4 | | O₂ F5 | O₂ F6 | O₁ F7 |
| | (B) | O₄ G1 | O₄ G2 | O₂ G3 | O₂ G4 | O₃ G5 | O₂ G6 | O₂ G7 | O₃ G8 |
| | (C) | | O₄ H1 | O₂ H2 | O₃ H3 | O₂ H4 | O₂ H5 | O₃ H6 | O₄ H7 |
| | (D) | O₃ I1 | | | O₂ I2 | O₂ I3 | O₂ I4 | O₂ I5 | O₄ I6 |
| CELL RESIDUE STATE INSIDE OF THE BUFFER MEMORY | (E) | | F1 | | | G4 | G4 | G4 | F6 |
| | (F) | | G1 | | | H3 | | | G7 |
| | (G) | | I1 | | | I2 | I2 | I2 | (H6)(I2) |
| | (H) | | | F2 | | | G5 | | I5 |
| | (I) | | | G2 | G2 | | H4 | H4 | H4 |
| | (J) | | | H1 | H1 | H1 | I3 | I3 | I3 |
| | (K) | | | | F3 | | | F5 | F5 |
| | (L) | | | | G3 | | | G6 | G6 |
| | (M) | | | | H2 | H2 | | H5 | H5 |
| | (N) | | | | | F4 | F4 | I4 | I4 |
| OUTGOING LINE TRANSMITTING CELL | (O) | | | O₁ F1 | | O₁ F3 | | | |
| | (P) | | | | | | O₂ G3 | O₂ H2 | O₂ F4 | O₂ G4 |
| | (Q) | | | O₃ I1 | | | O₃ H3 | O₃ G5 | |
| | (R) | | | O₄ G1 | O₄ F2 | O₄ G2 | O₄ H1 | | |

Fig.32    RELATED ART (CONTINUATION OF Fig.31)

|   | 9 | 10 | 11 | 12 | 13 | 14 | 15 | 16 |
|---|---|----|----|----|----|----|----|----|
|   |   | O₄ F8 |   | O₃ F9 |   | O₃ F10 | O₁ F11 |   |
|   | O₃ G9 |   | O₄ G10 |   | O₁ G11 | O₁ G12 | O₂ G13 | O₄ G14 |
|   |   |   | O₁ H8 | O₄ H9 | O₄ H10 | O₄ H11 | O₄ H12 |   |
|   |   | O₁ I7 | O₁ I8 |   |   | O₂ I9 |   |   |
|   | F6 | F6 | I7 F6 | F6 | F6 | F6 | (H11)(F6) |   |
|   | G7 | G7 |   | G7 G10 G7 | G7 | G7 | I9 G7 | I9 G7 |
|   |   |   |   | H8 |   |   |   | F11 |
|   | I5 | I5 | I5 | I8 I5 | I8 I5 | I5 | I5 | G13 I5 |
|   | (F7)(H4) |   |   |   | F9 |   |   | H12 |
|   | G8 I3 | (G8)(I3) |   |   | H9 |   |   |   |
|   | H7 F5 | F5 | F5 |   |   | G11 |   |   |
|   | I6 G6 | I6 G6 | G6 | G6 | I6 | H10 |   |   |
|   | H5 | G9 H5 | G9 H5 | H5 | H5 |   | F10 |   |
|   | I4 | I4 | F8 I4 | I4 | I4 | I4 | G12 |   |
|   |   | O₁ F7 |   | O₁ I7 | O₁ H8 | O₁ I8 | O₁ G11 | O₁ G12 |
|   | O₂ I2 | O₂ H4 | O₂ I3 | O₂ F5 | O₂ G6 | O₂ H5 | O₂ I4 | O₂ F6 |
|   | O₃ H6 |   | O₃ G8 | O₃ G9 |   | O₃ F9 |   | O₃ F10 |
|   |   | O₄ H7 | O₄ I6 | O₄ F8 | O₄ G10 | O₄ H9 | O₄ H10 | O₄ H11 |

Fig.34  RELATED ART

| | TIME SLOTS 6 | 7 | 8 | 9 | 10 | 11 | 12 | 13 |
|---|---|---|---|---|---|---|---|---|
| (E) | G4 | G4 | F6 | F6 | F6 | F6 I7 F6 | F6 | F6 |
| (F) | | | G7 | G7 | G7 | G7 G10 G7 | G7 |
| (G) | I2 | I2 (H6) | (I2) | | | | H8 | |
| (H) | G5 | | I5 | I5 | I5 | I5 | I5 I8 | I5 I8 I5 |
| (I) | H4 | H4 | H4 (F7)(H4) | | | | | F9 |
| (J) | I3 | I3 | I3 G8 | (G8)(I3) | | | | H9 |
| (K) | | F5 | F5 H7 F5 | F5 | F5 | | | |
| (L) | | G6 | G6 I6 | G6 | G6 | G6 | G6 | I6 |
| (M) | | H5 | H5 | H5 | H5 G9 | H5 G9 | H5 | H5 |
| (N) | F4 | I4 | I4 | I4 | I4 | I4 F8 | I4 | I4 |

CELL RESIDUE STATE IN THE BUFFER MEMORY $24_1 \sim 24_m$: INCOMING LINE SPEED ADJUSTMENT BUFFER Fig.37 RELATED ART

| TIME SLOTS | 1 | 2 | 3 | 4 | 5 | 6 | 7 | 8 |
|---|---|---|---|---|---|---|---|---|
| (A) | $O_1$ F1 | $O_4$ F2 | $O_1$ F3 | $O_2$ F4 | | $O_2$ F5 | $O_2$ F6 | $O_2$ F7 |
| (B) | $O_4$ G1 | $O_4$ G2 | $O_2$ G3 | $O_2$ G4 | $O_3$ G5 | $O_2$ G6 | $O_2$ G7 | $O_3$ G8 |
| (C) | | $O_4$ H1 | $O_2$ H2 | $O_3$ H3 | $O_2$ H4 | $O_2$ H5 | $O_2$ H6 | $O_2$ H7 |
| (D) | $O_3$ I1 | | | | $O_2$ I2 | $O_2$ I3 | $O_2$ I4 | $O_2$ I5 $O_2$ I6 |
| (E) | | F1 | | | G4 | G4 | G4 | F6 |
| (F) | | G1 | | | H3 | | | G7 |
| (G) | | I1 | | | I2 | I2 | I2 | H6 I2 |
| (H) | | | F2 | | | G5 | | I5 |
| (I) | | | G2 | G2 | | H4 | H4 | H4 |
| (J) | | | H1 | H1 | H1 | I3 | I3 | I3 |
| (K) | | | | F3 | | | F5 | F5 |
| (L) | | | | G3 | | | G6 | G6 |
| (N) | | | | H2 | H2 | | H5 | H5 |
| (M) | | | | | F4 | F4 | I4 | I4 |
| (O) | | | $O_1$ F1 | | $O_1$ F3 | | | |
| (P) | | | | | | $O_2$ G3 $O_2$ H2 | $O_2$ F4 | $O_2$ G4 |
| (Q) | | | $O_3$ I1 | | | $O_3$ H3 | $O_3$ G5 | |
| (R) | | | $O_4$ G1 | $O_4$ F2 | $O_4$ G2 | $O_4$ H1 | | |

| | 17 | 18 | 19 | 20 | 21 | 22 |
|---|---|---|---|---|---|---|
| | | | | | | |
| | | | | | | |
| | | | | | | |
| | H8 | H8 | H8 | H8 | H8 | H8 |
| | I7 | I7 | I7 | I7 | I7 | I7 |
| | F9 H6 | F9 | F9 | F9 | F9 | F9 |
| | G10 I5 | G10 I5 | G10 | G10 | G10 | G10 |
| | H9 F7 | H9 F7 | H9 F7 | H9 | H9 | H9 |
| | | | | | | |
| | H7 | H7 | H7 | H7 | | |
| | I6 | I6 | I6 | I6 | I6 | |
| | F8 | F8 | F8 | F8 | F8 | F8 |
| | G9 | G9 | G9 | G9 | G9 | G9 |
| | | | | | | |
| | $O_2$ G7 | $O_2$ H6 | $O_2$ I5 | $O_2$ F7 | $O_2$ H7 | $O_2$ I6 |
| | | | | | | |
| | | | | | | |

(CONTINUATION OF Fig.38)

CELL SWITCHING APPARATUS AND A CELL SWITCHING SYSTEM

BACKGROUND OF THE INVENTION

1. Field of the Invention

This invention relates to a cell switching apparatus or cell switching system which switches a cell, in which various types of multi media information such as speech, data, image and so forth are transmitted, at a high speed.

2. Description of the Related Arts

Related Art 1.

In an Asynchronous Transfer Mode (ATM) communication system, consecutive signals such as a communication line signal and speech, and bursty signal such as data and motion video are all divided into a fixed length of signal. A header to indicate the destination information is then added to the fixed length of signal and thus a packet is composed. The information is transferred in the packet. A synchronization with a terminal and a network like a frame synchronization is not required and a speed at the terminal and the network is independent. Therefore, it is possible to handle ATM communications with any types of terminals. However, since packets arrive randomly at the high speed packet switch, a large number of packets may rush to one destination at a time. As a result, queueing of packets would be advantageous in order to prevent the loss of the information.

As to the problem, in FIGS. 5 and 6 in "PRELUDE: An Asynchronous Time-Division Switched Network", (Jean-Pierre Coudreuse, Michel Servel, session 22, article number 2, International Conference on Communications, 1987), an (n×m) shared buffer type high speed packet switch is proposed. This article relates to the high speed packet switch in the ATM communication system which effectively multiplexes and transmits line switching data and packet switching data. A conventional data queue unit is included in a controller 160. FIG. 29 is a block diagram showing the example.

Data arrive at n (n≧2) number of incoming lines $1_1$ to $1_n$. The packet which reaches to the incoming lines has a fixed length. The data go out from m (m≧2) number of outgoing lines $2_1$ to $2_m$. A packet multiplexing circuit 130 multiplexes the input packets. A shared buffer memory 140 can write the data in the indicated address and read out data with an indicated address without relating to the writing order by indicating the address. A packet demultiplexing circuit 150 demultiplexes read out packets. The controller 160 controls the packet switching.

Generally, memory operation speed is lower than gate operation speed. In this example, however, when the switch scale becomes large or the accommodated line speed becomes higher, the memory needs to operate faster.

Related Art 2.

FIG. 30 is a block diagram showing a conventional cell switching apparatus shown in Japanese Published and Unexamined Patent Hei 4-211548.

In FIG. 30, a cell is composed of a header and a payload part. The header includes its channel or path number as the destination information. Cells arrive at the n (n≧2) number of incoming lines $1_1$ to $1_n$. The cells are transmitted to m (m≧2) number of outgoing lines $2_1$ to $2_m$ according to the destination information indicated by their headers.

Header processing circuits $10a_1$ to $10a_n$ are provided to each of the incoming lines $1_1$ to $1_n$. The header processing circuits $10a_1$ to $10a_n$ detect the outgoing lines $2_1$ to $2_m$ as its destination according to the header of a cell arriving at the incoming lines $1_1$ to $1_n$.

Then, p (p≧n) number of buffer memories $11_1$ to $11_p$ store the cell in the indicated address. The stored cell can be read out from the buffer memories $11_1$ to $11_p$ with an indicated address without relating to the writing order. A plurality of cells can be stored in the whole buffer memories $11_1$ to $11_p$.

Memory controllers $12_1$ to $12_p$ are provided to each of the buffer memories $11_1$ to $11p$. The memory controllers $12_1$ to $12_p$ pool empty addresses by using the FIFO-type memory, for instance, and give the read addresses or write addresses to the corresponding buffer memories $11_1$ to $11_p$.

An incoming line space switch 13 selectively connects the header processing circuits $10a_1$ to $10a_n$ to appropriate buffer memories $11_1$ to $11_p$. An outgoing line space switch 14 selectively connects the buffer memories $11_1$ to $11p$ to appropriate outgoing lines $2_1$ to $2_m$.

Outgoing line speed adjustment buffers $23_1$ to $23_m$ are provided to each of the outgoing lines $2_1$ to $2_m$. The outgoing line speed adjustment buffers $23_1$ to $23_m$ are connected to buffer memories $11_1$ to $11_p$ via the outgoing line space switch 14. Then they store the cells that are read out at a r (2≧r<the number of outgoing lines) times of outgoing-line speed. The outgoing line speed adjustment buffers $23_1$ to $23_m$ transmit the read out cells to the corresponding outgoing lines $2_1$ to $2_m$.

A buffer controller is has a writing buffer selective circuit 16, an address switching circuit 17, address queues $18_1$ to $18_m$ and a read out buffer selective circuit 19. The buffer controller 15 controls the switching of the incoming line space switch 13 and selects buffers $11_1$ to $11p$ in which the cell is written. The buffer controller 15 then manages the addresses in the buffer memories $11_1$ to $11p$ in accordance with the destination information of the cell. Based on the results, the buffer controller 15 reads out the cells at r (2≧r<the number of outgoing lines) times of the outgoing speed in a fixed order. In addition, the outgoing line space switch 14 is controlled in order that the cells are transmitted to the outgoing lines $2_1$ to $2_m$ indicated in their headers. The cells are then written in the associated outgoing line speed adjustment buffers $23_1$ to $23_m$. The cells are next read out at the outgoing-line speed to be transmitted to the associated outgoing lines $2_1$ to $2_m$.

In the buffer controller 15, when a cell reaches the incoming lines $1_1$ to $1_n$, the writing buffer selective circuit 16 receives the outgoing line number of the cell detected by the header processing circuits $10a_1$ to $10a_n$ associated with the incoming lines $1_1$ to $1_n$. In order to select buffer memories $11_1$ to $11p$ for storing the cell and to connect the selected buffer memory to the header processing circuits $10a_1$ to $10a_n$, the writing buffer selective circuit 16 controls the switching of the incoming line space switch 13.

An address switching circuit 17 sorts the arriving cells with reference to the outgoing line numbers detected by the buffer selective circuit 16. The write addresses in the buffer memories $11_1$ to $11p$ in which the cells are written are received from the memory controllers $12_1$ to $12_p$ associated with the buffer memories $11_1$ to $11_p$. Then, the write addresses are written into address queues which will be mentioned later.

The address queues $18_1$ to $18_m$ are composed of the FIFO type memories and provided corresponding to each outgoing line $2_1$ to $2_m$. In the address queues $18_1$ to $18_m$, for each of associated outgoing lines $2_1$ to $2_m$, the write address on the buffer memories $11_1$ to $11p$ is written by the address switching circuit 17 in the arriving order. In the buffer memories $11_1$ to $11_p$, the cells whose destinations are the outgoing lines $2_1$ to $2_n$ are stored.

The read out buffer selective circuit 19 chooses the cell to be read out from the buffer memories $11_1$ to $11p$ with reference to the address queues $18_1$ to $18_m$. The read out buffer selective circuit 19 reads out the addresses from the address queues $18_1$ to $18_m$, and sends them to the memory controllers $12_1$ to $12_p$ which are associated with the buffer memories $11_1$ to $11_p$. Simultaneously, the read out buffer selective circuit 19 controls the switching of the outgoing line space switch 14 which connects the buffer memories $11_1$ to $11_p$ to the associated outgoing lines $2_1$ to $2_m$.

The operation will now be described. FIGS. 31 to 33 are timing charts showing an example of each element. The chart shows a flow of control in a ease where the number of incoming lines $1_1$ to $1_n$, n is four and the number of outgoing lines $2_1$ to $2_m$, m is four as well and the number of buffer memories $11_1$ to $11p$, p is 10.

The cell handled here has a fixed length and comes randomly. Before arriving at the incoming lines $1_1$ to $1_n$, cell input phase is adjusted, namely the cells arriving at all the lines have the same phase.

In FIGS. 31–33, (A) to (D) show one example of the cell input to the incoming lines $1_1$ to $1_4$. (E) to (N) show one example of the stored cells in the buffer memories $11_1$ to $11_{10}$. (O) to (R) show one example of cells to be transmitted from the outgoing lines $2_1$ to $2_4$. Herein, is assumed that all the circuits are synchronized and the input and output of one cell can be done in one time slot.

When cells come to the incoming lines $1_1$ to $1_4$, the header processing circuits $10a_1$ to $10a_4$ which are associated with each incoming lines $1_1$ to $1_4$ detect the outgoing line number from the headers of the incoming cells. The writing buffer selective circuit 16 in the buffer controller 15 directs the incoming line space switch 13 to connect the incoming lines $1_1$ to $1_4$ where the cell arrived to the buffer memories $11_1$ to $11_{10}$ which are selected to store the cells, respectively, with reference to the header processing circuits $10a_1$ to $10a_4$.

Various types connecting methods of the incoming line space switch 13 are possible. When some cells are stored in the buffer memories $11_1$ to $11_{10}$ and read out later, it is not desirable that there are two or more cells to be read out from the same buffer memory. Therefore, the method of distributing the cells to a lot of buffer memories $11_1$ to $11_{10}$ is most applicable.

In this case, the number of the buffer memories is insufficient when it equals to the number of the incoming lines $1_1$ to $1_4$. In order to solve the foregoing problems, having as many buffer memories as possible can simplify the control.

Here we propose a further simplified control example where the buffer memory with the minimum cell storage is selected and incoming cells are written there. In this method, when the x number of cells arrive simultaneously, the x number of buffer memories which have the least cell storage are selected and the incoming lines $1_1$ to $1_4$ are connected to the selected buffer memories.

Here is another simplified example of control in which buffer memories $11_1$ to $11_{10}$ are selected in order, and the arriving cells are being written. Namely, the buffer memories $11_1$, $11_2$, $11_3$ ... $11_{10}$ are selected in regular order and the arriving cells are being written.

In time slot 1 as shown in FIG. 31, F1 cell, the first cell of a signal f (Hereinafter, the first cell of the signal f is referred to as F1 cell. Other cells which will be described are referred to in the same way.), is received from the incoming line $1_1$. G1 cell of a signal g is received from the incoming line $1_2$ and an I1 cell of a signal i is input from the incoming line $1_4$. The header part of each cell has an outgoing line number of the destination. i.e., F1 cell has $O_1$ to indicate the outgoing line $2_1$, G1 cell has $O_4$ to indicate the outgoing line $2_4$ and I1 cell has $O_3$ to indicate the outgoing line $2_3$.

In time slot 2, the incoming line space switch 13 connects the incoming line $1_1$ to the buffer memory $11_1$, the incoming line $1_2$ to the buffer memory $11_2$, and the incoming line $1_4$ to the buffer memory $11_3$, respectively. Accordingly, in the time slot 2, these cells are stored at the address indicated by the memory controllers $12_1$ to $12_3$ in the buffer memories $11_1$ to $11_3$.

From each of the memory controllers $12_1$ to $12_p$, the write address of each of the buffer memories $11_1$ to $11_3$ are transmitted to the address switching circuit 17. The write address is selected among the addresses which the memory controllers $12_1$ to $12_3$ manage as empty addresses.

The address switching circuit 17 sorts each incoming cell according to the destination output lines with reference to the writing buffer selective circuit 16. The address switching circuit 17 then writes the write address of the buffer memory $11_1$ on the address queue $18_1$, the write address of the buffer memory $11_2$ on the address queue $18_4$ and the write address of the buffer memory $11_3$ at the tail of the address queue $18_3$, respectively.

In time slot 3, the read out buffer selective circuit 19 extracts the address stored in the address queues $18_1$ to $18_4$ and sends it to the memory controllers $12_1$ to $12_3$ associated with the buffer memories $11_1$ to $11_3$. Meanwhile, the read out buffer selective circuit 19 directs the outgoing space switch 14 to connect the buffer memories $11_1$ to $11_3$ to the outgoing lines $2_1$, $2_3$ and $2_4$, respectively. Hereby, in the time slot 3, the outgoing space switch 14 connects the buffer memory $11_1$ to the outgoing line $2_1$, the buffer memory $11_2$ to the outgoing line $2_4$, the buffer memory $11_3$ to the outgoing line $2_3$, respectively.

Each of the memory controllers $12_1$ to $12_3$ transmits the received address to the associated buffer memories $11_1$ to $11_3$ as the read address. After that, the address is managed as an empty address. The cell read out from each of the buffer memories $11_1$ to $11_3$ are output to the destinations indicated by each header, i.e., the outgoing lines $2_1$, $2_4$, and $2_3$.

In the above-stated examples, the destination outgoing lines of the input cell were all different. The cells input in the time slot 2 however have the identical destination outgoing line. An F2 cell, a G2 cell and an H1 cell input in the time slot 2 are written on the buffer memories $11_4$, $11_5$, and $11_6$, respectively. Each of the headers of these three cells has $O_4$ to indicate the outgoing line $2_4$.

In an example in FIGS. 31 to 33, the output priority of the outgoing cells is given in numerical order of the incoming line number and the queuing of the cell is carried out according to the priority. In time slots 4, 5, and 6, the F2, the G2, and the H1 cells are read out in the order of the buffer memories $11_4$, $11_5$, $11_6$ and transferred to the outgoing lines $3_4$ based on the output priority. Hereinafter, the switching of the cell is executed according to this procedure.

In time slot 8, an I2 cell and an H6 cell are stored in the buffer memory $11_3$. As for these cells, each destination is different from each other. For instance, in case of the I2 cell, the destination is the outgoing line $2_2$ and in case of the H6 cell, the outgoing line $2_3$. If they are read out at the same speed of the outgoing line speed of the outgoing lines $2_1$ to $2_4$, they cannot be extracted simultaneously because both of them are stored in a single buffer memory, i.e., the buffer memory $11_3$.

FIGS. 34 to 35 are timing charts showing extended parts of time slots 6 to 13 in FIGS. 31 to 33. In FIGS. 34 to 35, there is shown a case that the read out of the buffer memories $11_1$ to $11_{10}$ is performed at a three times of outgoing line speed. In the figure, (E) to (N) show an example of stored cells, (S) to (V) show a writing state of the cell to the outgoing line speed adjustment buffers $23_1$ to $23_4$. (O) to (R) show an example of cell output from the outgoing lines $2_1$ to $2_4$.

In the above-stated time slot 8, each of the I2 cell and the H6 cell in the buffer memory $11_3$ has its own destination. When they are read out at a three times of outgoing line speed by the buffer memory $11_3$, it is possible to transfer both of the cells to the associated outgoing lines $2_2$ and $2_3$ simultaneously. Namely, when they are read out at a three times of outgoing line speed from the buffer memories $11_1$ to $11_{10}$, up to three cells can be read out from each of the buffer memories $11_1$ to $11_{10}$ in the same time slot.

Such cases occur in other time slots 9, 10 and 15. In any case, waiting of cells is not happening even though the plurality of cells are in the same queue and the output cell collision can be prevented.

Here, there was shown a case that the read out speed of the buffer memories $11_1$ to $11_{10}$ is assumed to be three times of the outgoing line speed. In general, the read out speed can be r times of the outgoing line speed, which is more than two times and less than the number of outgoing lines. As each of the buffer memories $11_1$ to $11_{10}$, a dual-port memory can be used. However, a single-port memory operable at more than a double speed is also useful.

In a case where the number of cells to be read out from the same buffer memory, in one time slot exceeds the number r, it is possible to avoid all the collision when only the r number of cells are extracted by giving the priority corresponding to the outgoing lines $2_1$ to $2_m$. The priority should be updated at each time according to a predefined method or randomly. In this way, waiting of cells is not happening even though the plurality of cells are in the same queue and the output cell collision can be prevented.

Related Art 3.

Another related art will now be described with reference to attached figures. FIG. 36 is a block diagram showing a configuration of a conventional cell switching apparatus. The same signs are attached to the elements equivalent or corresponding to those of the cell switching apparatus according to the related art 2 and the explanation will be omitted.

In FIG. 36, incoming-line speed-adjustment buffers $24_1$ to $24_n$ are provided associated with each of the incoming lines $1_1$ to $1_n$. The cell transmitted from the associated header processing circuits $10a_1$ to $10a_n$ is stored in incoming-line speed-adjustment buffers $24_1$ to $24_n$. The cell is then read out at a speed of w ($2 \geq w <$ the number of incoming lines) times of incoming line speed and transmitted to appropriate buffers $11_1$ to $11p$ connected by the incoming line space switch 13.

The buffer controller 15 has the writing buffer selective circuit 16, the address switching circuit 17, the address queues $18_1$ to $18_m$, and the read out buffer selective circuit 19. The cell stored in the incoming-line speed-adjustment buffers $24_1$ to $24_n$ is read out at a speed of w ($2 \geq w <$ the number of incoming lines) times of incoming line speed. By selecting the buffer memories $11_1$ to $11p$ to which the cell is written by controlling the incoming line space switch 13, the cell is written in the buffer memories $11_1$ to $11p$ at a speed of w times of the incoming line speed. Simultaneously, the address of the buffer memories $11_1$ to $11p$ is managed according to destinations of the cells. The buffer controller 15 controls the outgoing line space switch 14 and transmits the cell to the outgoing lines $2_1$ to $2_m$ indicated at the header of the cell in an appropriate order.

The operation will now be described. FIGS. 37 to 38 are timing charts showing the timing point of the signals of each element. As in the Related Art 2, there is shown a flow of control in a case where the number of incoming lines $1_1$ to $1_n$, n and the number of outgoing lines $2_1$ to $2_m$, m are four, respectively and the number of the buffer memories $11_1$ to $11_p$, p is ten. The (A) to (R) are equivalent to those in FIGS. 31 to 33, respectively.

The capacity of each of the buffer memories $11_1$ to $11p$ is two cells. The cell treated here arrives at random in a fixed length. Before coming to the incoming lines $1_1$ to $1_n$, the cell input phase is adjusted and the cell arriving at all the lines is assumed to be supplied with the same phase.

When the cell comes to the incoming lines $1_1$ to $1_4$, the header processing circuits $10_1$ to $10_4$ associated with each of the incoming lines $1_1$ to $1_4$ detect the outgoing line number from the header and writes the cell in the associated incoming-line speed-adjustment buffers $24_1$ to $24_4$.

On the other hand, the writing buffer selective circuit 16 in the buffer controller 15 directs the incoming line space switch 18 to connect the incoming line speed adjustment buffers $24_1$ to $24_4$ with the buffer memories $11_1$ to $11_{10}$ selected to store the cell.

The read out speed of the incoming-line speed-adjustment buffers $24_1$ to $24_4$, i.e., the writing speed of the buffer memories $11_1$ to $11_{10}$ are assumed to be twice of the incoming line speed of the incoming lines $1_1$ to $1_4$. In one time slot, two cells can be written in the same buffer memory.

It is assumed that buffer memories $11_1, 11_2, \ldots 11_3, \ldots 11_{10}$ are selected in this order and the arrived cells are being consecutively written. When there is a buffer memory which is already full among the buffer memories $11_1$ to $11_{10}$ in one time slot, the buffer memory is ignored and the cell is written in the next buffer memory.

It is desirable to distribute the writing of the cells in the different buffer memories $11_1$ to $11_{10}$. In this example, the write speed of the buffer memories $11_1$ to $11_{10}$ is set to be twice of the incoming speed. Accordingly, in a case where there occurs a cell discard in one buffer memories $11_1$ to $11_{10}$, the writing of plural cells (two cells) in one time slot is allowed so as to lower the chance of cell discard.

Namely, an F10 cell, an H10 cell, and an I8 cell are arriving in time slot 11 in FIGS. 37 to 39. Only two cells in the empty buffer memory $11_6$ in time slot 11 and one cell of the empty buffer memory $11_7$ are available at this time. Therefore, it is impossible to write each of them at different buffer memories.

Accordingly, by using the fact that the writing speed to the buffer memories $11_1$ to $11_{10}$ is twice of the incoming line speed, the cell discard is prevented by writing two cells, the F10 cell and the H10 cell in the buffer memory $11_6$. There is shown a state that the writing of these three cells is finished in (J), (K) of FIG. 38 surrounded by the actual line.

Hereinafter, the basic procedure of cell switching is performed as in the Related Art 2.

As has been described, there is shown a case that the write speed to the buffer memories $11_1$ to $11_{10}$ is assumed to be twice of the incoming line speed. In general, the incoming line speed can be w times. W is more than two and less than the number of incoming lines. For each of the buffer memories $11_1$ to $11_{10}$, a dual-port memory can be used. However, a single-port memory operable more than a double speed is also useful.

As described in Related Art 1, in the shared buffer type switch of (n×m) size, when n or m becomes large, the size of the shared buffer memory (SBM) enlarges according to the number of the outgoing lines m. In addition, since the number of the accesses is proportional to (n+m), the SBM should adopt a high speed memory.

If a switch which has only one conventional SBM, so as to realize the scale of (n×m), the SBM needs the higher access speed in proportion to (n+m). Consequently, when the number of incoming lines n increases, the operation speed of the memory will be the problem.

In the switch which provides a plurality of buffer memories as shown in Related Arts 2 and 3, the problem that the memory to implement the high speed access should be adopted will be eased, compared with the switch which has only one shared buffer memory as shown in Related Art 1.

In Related Art 2, there is shown a case in which the switching function will be further improved by increasing the read-out speed. As in Related Art 3, there is shown a case of improving the switching ability by increasing the writing speed. In Related Arts 2 and 3, it was mentioned that the processing ability of the switch will be improved by increasing the read-out and write speed of the cell. However, there were less description about how the read out and write of the cell is concretely performed with high speed.

SUMMARY OF THE INVENTION

This invention solves the foregoing problems to provide the cell switching apparatus which increases the number of incoming lines and the number of outgoing lines without increasing the access speed of the buffer memory.

It is an object of this invention to provide the cell switching apparatus which can excessively increase the number of the incoming lines.

It is an object of this invention to provide the cell switching apparatus which writes the arrived cell with priority in the buffer memory and can lower the cell loss rate.

By using the cell switching apparatus, it is an object of this invention to provide the cell switching system which has a large scale of switch and can change the scale of the switch based on a building block basis according to the applicating system.

It is an object of this invention to provide the cell switching system which realizes a large scale of switch having a large number of incoming lines.

It is an object of this invention to provide a cell switching system with a simplified configuration in which the cell switching apparatuses are connected in parallel.

According to one aspect of this invention, a cell switching apparatus hay include:

a plurality of incoming lines for receiving a cell having data and a header that includes destination information;

a plurality of outgoing lines, the cell being transmitted from a selected outgoing line of the plurality of outgoing lines according to the destination indicated by the header, during a predefined one cell time;

a plurality of header processing circuits, connected to each of the incoming lines, for selecting the selected outgoing line according to the destination information from the header of the cell input from the incoming line;

a plurality of buffer memories, the cell being written to a selected buffer memory of the plurality of buffer memories by indicating an address, and which is possible to read out the cell, without relating to a writing order of any other cells stored in the selected buffer memory, by indicating the address;

an incoming line space switch for selectively connecting the header processing circuits to the buffer memories;

an outgoing line space switch for selectively connecting the buffer memories to the outgoing lines; and, a buffer controller for controlling the incoming line space switch and selecting the selected buffer memory in which the cell is written, the buffer controller being constructed and arranged to read a first plurality of cells from the plurality of buffer memories and to write a second plurality of cells to the plurality of buffer memories during the one predefined cell time, the buffer controller further controlling the outgoing line space switch so as to output the cell to the selected outgoing line, and wherein the cell is output From the outgoing line.

According to one aspect of this invention, a cell switching system may include:

a plurality of cell switching apparatuses, arranged in parallel, and a plurality of input lines respectively connected to the incoming lines of each of the plurality of cell switching apparatuses.

According to one aspect of this invention, a cell switching method for a cell switching apparatus, wherein the cell switching apparatus may receive and transmit cells during a predefined one cell time, divide the predetermined cell time into a plurality of access intervals, and may read out and write one cell during one of the plurality of access intervals, the method may include the steps of:

(a) clearing fields of a score table having a first dimension indicative of a number of buffer memories in the cell switching apparatus and a second dimension indicative of a number of access intervals in the predefined one cell time;

(b) allocating one read out of a cell from one of the plurality of buffer memories during each of the plurality of access intervals, the one read out being indicated in corresponding fields of the score table, so that there are remaining unallocated fields of the score table;

(c) allocating writing of a plurality of cells to the plurality of buffer memories to the remaining unallocated fields of the score table; and, (d) executing the one read and the writing allocated on the score table during each of the plurality of access intervals.

According to one aspect of this invention, a method For performing a plurality of read accesses and a plurality of write accesses to a plurality of buffer memories during a predefined cell time so that a read access to one buffer memory of the plurality of buffer memories does not occur simultaneously with a write access to the one buffer memory, the method may include the steps of:

dividing the predefined cell time into a plurality of access times so that each of the plurality of buffer memories may be accessed during each of the plurality of access times;

performing one first read access to one of the plurality of buffer memories and at least one write access to at least one other of the plurality of buffer memories during a first access time of the plurality of access times;

performing one second read access to one of the plurality of buffer memories during a second access time of the plurality of access times; and when any of the plurality of write accesses remain after the first access time, performing at least one of the remaining write accesses to at least one other of the plurality of buffer memories during the second access time.

BRIEF DESCRIPTION OF THE DRAWINGS

In the drawings,

FIG. 3 shows one example of a score table according to this invention;

FIG. 4 shows one example of an address queue of the operation according to this invention;

FIG. 7 shows one example of a score table so as to perform the read out and writing connecting type control according to an embodiment of this invention;

FIG. 10 shows another example of the score table according to this invention;

FIG. 13 shows a dual port buffer memory according to an embodiment of this invention;

FIG. 14A shows a reading score table in case that the dual port buffer memory is used;

FIG. 14B shows a writing score table in case that the dual port memory is used;

FIG. 21 shows a relationship between the number of outgoing lines and the number of incoming lines of the cell switching apparatus according to an embodiment of this invention;

FIG. 25 shows one example of the evaluation of the cell switching system according to this invention;

FIG. 31 shows a timing chart of a timing point of the signal in each part of a conventional cell switching apparatus;

FIG. 32, which is a continuation of FIG. 31, shows a timing chart of a timing point of the signal in each part of a conventional cell switching apparatus;

FIG. 34 shows a timing chart of a timing point of the signal in each part of a conventional cell switching apparatus;

FIG. 37 shows a timing chart of a timing point of the signal in each part of a conventional cell switching apparatus;

Figure 38:
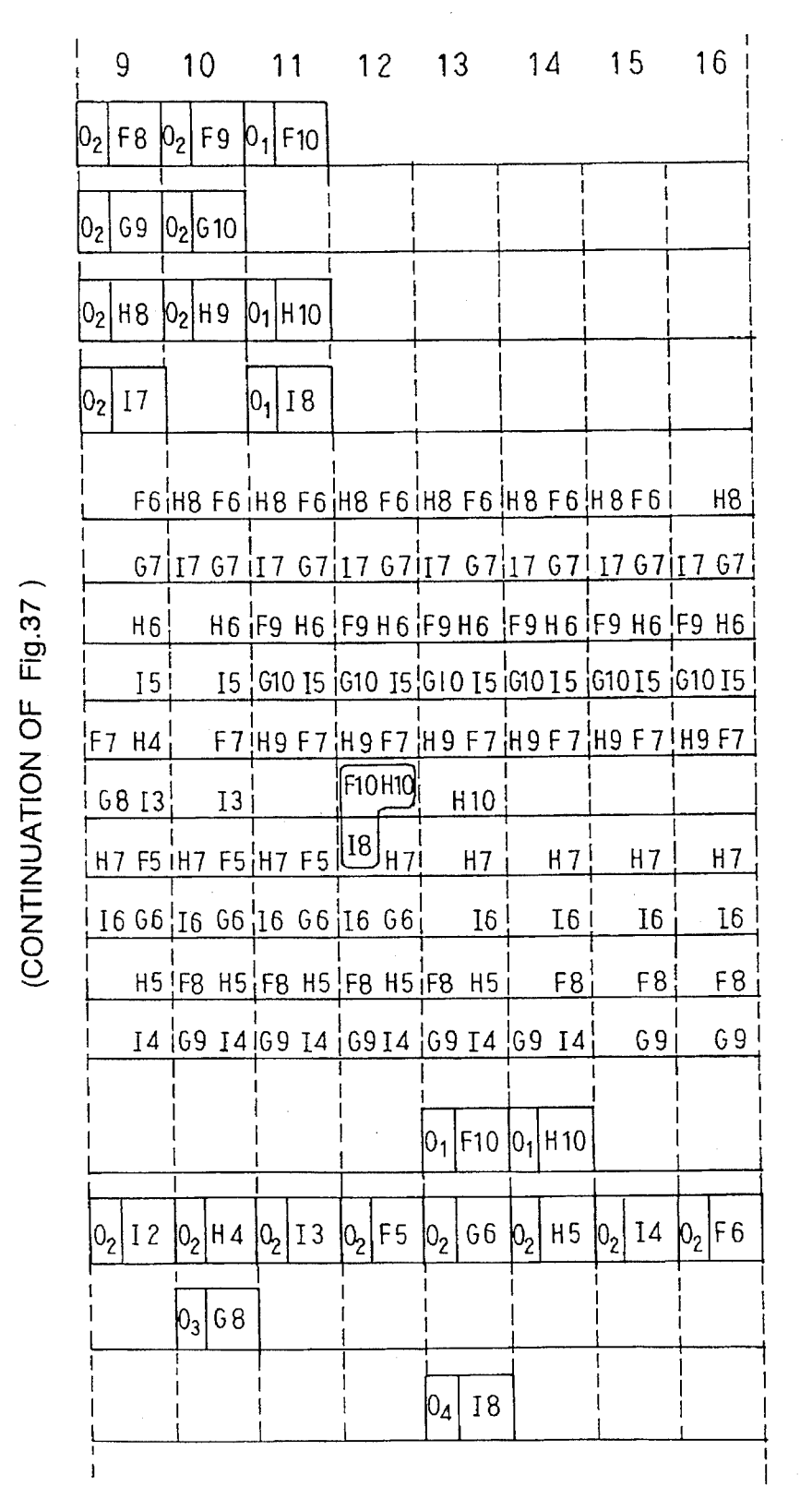

FIG. 38, which is a continuation of FIG. 37, shows a timing chart of a timing point of the signal in each part of a conventional cell switching apparatus; and FIG. 39, which is a continuation of FIG. 38, shows a timing chart of a timing point of the signal in each part of a conventional cell switching apparatus.

DESCRIPTION OF THE PREFERRED EMBODIMENTS

Embodiment 1

Figure 1:
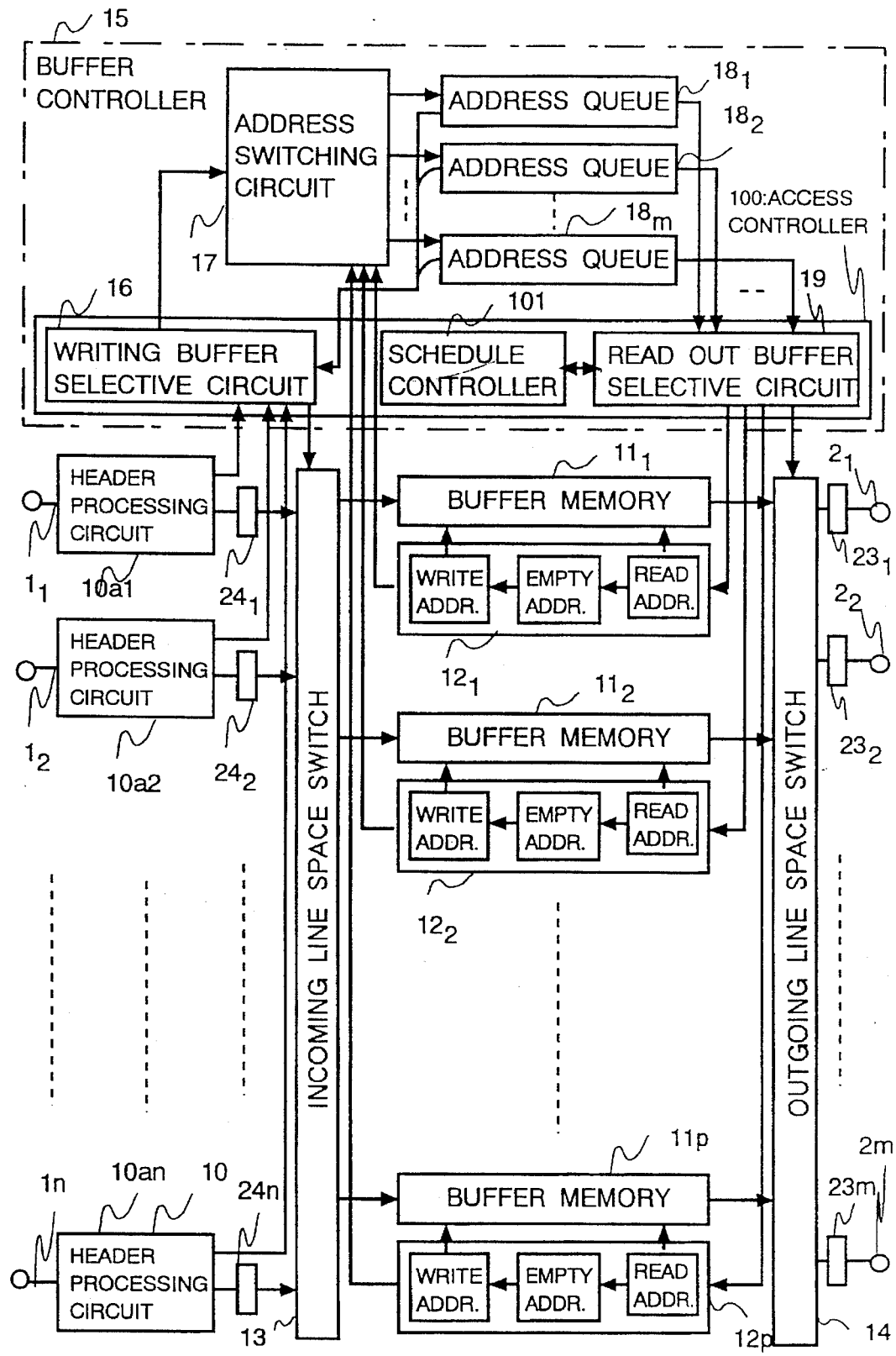
FIG. 1 shows a block diagram of a cell switching apparatus according to an embodiment of this invention.

FIG. 1 shows a view of one embodiment of a cell switching apparatus related to this invention. The identical signs are attached to the elements equivalent or corresponding to those of the cell switching apparatus according to the related arts and the explanation will be omitted.

In FIG. 1, outgoing-line speed-adjustment buffers $23_1$ to $23_m$ are provided to each outgoing line. The outgoing-line speed-adjustment buffers $23_1$ to $23_m$ are connected to appropriate buffer memories according to an outgoing line space switch 14. The outgoing-line speed-adjustment buffers $23_1$ to $23_m$ store the cell read out at a speed of more than r times (more than twice) of outgoing line speed from the buffer memory. The outgoing line speed adjustment buffers $23_1$ to $23_m$ transmits the stored cell to the associated outgoing line according to the outgoing line speed.

The incoming-line speed-adjustment buffers $24_1$ to $24_n$ are provided to each incoming line. The incoming-line speed-adjustment buffers $24_1$ to $24_n$ store the cell output from the associated header processing circuit. The incoming-line speed-adjustment buffers $24_1$ to $24_n$ read out the stored cell at w times (twice, for example) of the incoming line speed and transfers the cell to an appropriate buffer connected by the incoming line space switch 13.

An access controller 100 has a writing buffer selective circuit 16, a read-out-buffer selective circuit 19, and a schedule controller 101. The access controller 100 controls the writing buffer selective circuit 16 and the read out buffer selective circuit 19 by using the scheduling controller 101.

Figure 2:
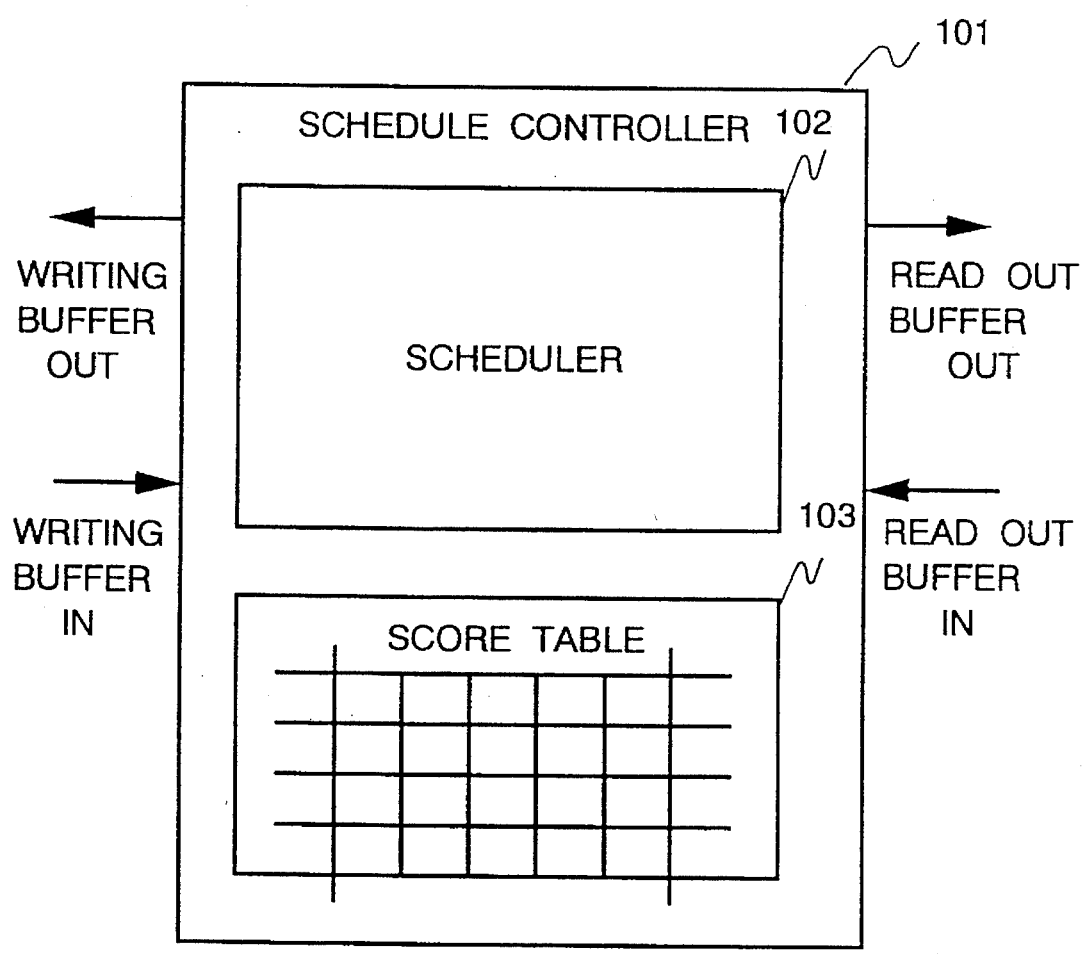
FIG. 2 shows a block diagram of a schedule controller according to an embodiment of this invention.

FIG. 2 is a block diagram illustrating one embodiment of the schedule controller 101. The schedule controller has a scheduler 102 and a score table 103. The schedule controller 101 receives the information of the writing buffer to write the cell coming from the writing buffer selective circuit 16 (hereinafter, items in such information are referred to as, $W_1$, $W_2$, $W_3$, . . . ). The schedule controller 101 receives the information of the read out buffer to read out the cell coming from the read-out-buffer selective circuit 19 (hereinafter, items in such information are referred to as, $R_1$, $R_2$, $R_3$, . . . ). The scheduler 102 makes a schedule based on these input information of the writing buffer and the read out buffer using the score table 103. When the contents of the score table 103 has been arranged, the schedule controller 101 informs the writing buffer selective circuit 16 of the buffer to which the cell is to be written. Similarly, the schedule controller 101 informs the read out buffer selective circuit 19 of the buffer to read out the cell.

FIG. 3 is a view of one example of the score table 103. In this example, there is shown a case that p, the number of buffer memories, is five. It is also assumed, in this example, that the number of outgoing lines m is 8 and 1 (one)-cell time is time for transmitting one cell to the outgoing lines and the one-cell time (one-cell time corresponds to the conventional one-time slot) is divided into eight access intervals equivalent to the number of outgoing lines m (=8). Therefore, the number of divisions x matches with the number of outgoing lines (x=m=8). The score table 103 is configured according to a matrix of (the number of buffer memories p)×(the number of divisions in one-cell time x). Namely, the score table 103 is composed of a field of p columns and m rows.

FIG. 4 shows one example of address queues $18_1$ to $18_m$. In this example, there is shown a case that the number of outgoing lines is eight. Accordingly, there are eight address queues $18_1$ to $18_8$. The information on each head of the address queues is the address information to read out the cell to be transmitted to each of the outgoing lines. When information $R_1$ to $R_8$ on the heads of the address queues $18_1$ to $18_8$ are received at the read-out-buffer selective circuit 19, the schedule controller 101 allocates the information $R_1$ to $R_8$ in order in each row, as shown in FIG. 3. In a case where $R_1$ is the address of the cell to be transmitted to the outgoing line $2_1$ and the address is contained in the memory buffer 4, for instance, as shown in the first row of FIG. 3, $R_1$ is allocated on the fourth column of the first row. Likewise, $R_2$ is the address information of the cell to be transmitted to the outgoing line $2_2$. In a case where the cell is stored in the buffer memory $11_5$, $R_2$ is allocated on the fifth column of the second row. Likewise, the information items $R_3$ to $R_8$ are allocated to each row of each column.

On the other hand, the information of the arrived cell input to the writing buffer selective circuit 16 is coming to the schedule controller 101. The schedule controller 101 performs the scheduling to write the arriving cell. For example, as shown in FIG. 3, the schedule controller 101 schedules the writing information in the field except for the one where either of the $R_1$ to $R_8$ has been already allocated. In FIG. 3, it is possible to allocate the writing information $W_1$ to $W_{32}$. FIG. 3 does not imply that the 32 writings of the information, from the $W_1$ to the $W_{32}$, are always scheduled but that the writings here can be scheduled up to 32 at its maximum, for this example. Thus, the scheduler 102 schedules the access in order that the writing and the read out should not be overlapped.

Figure 5:
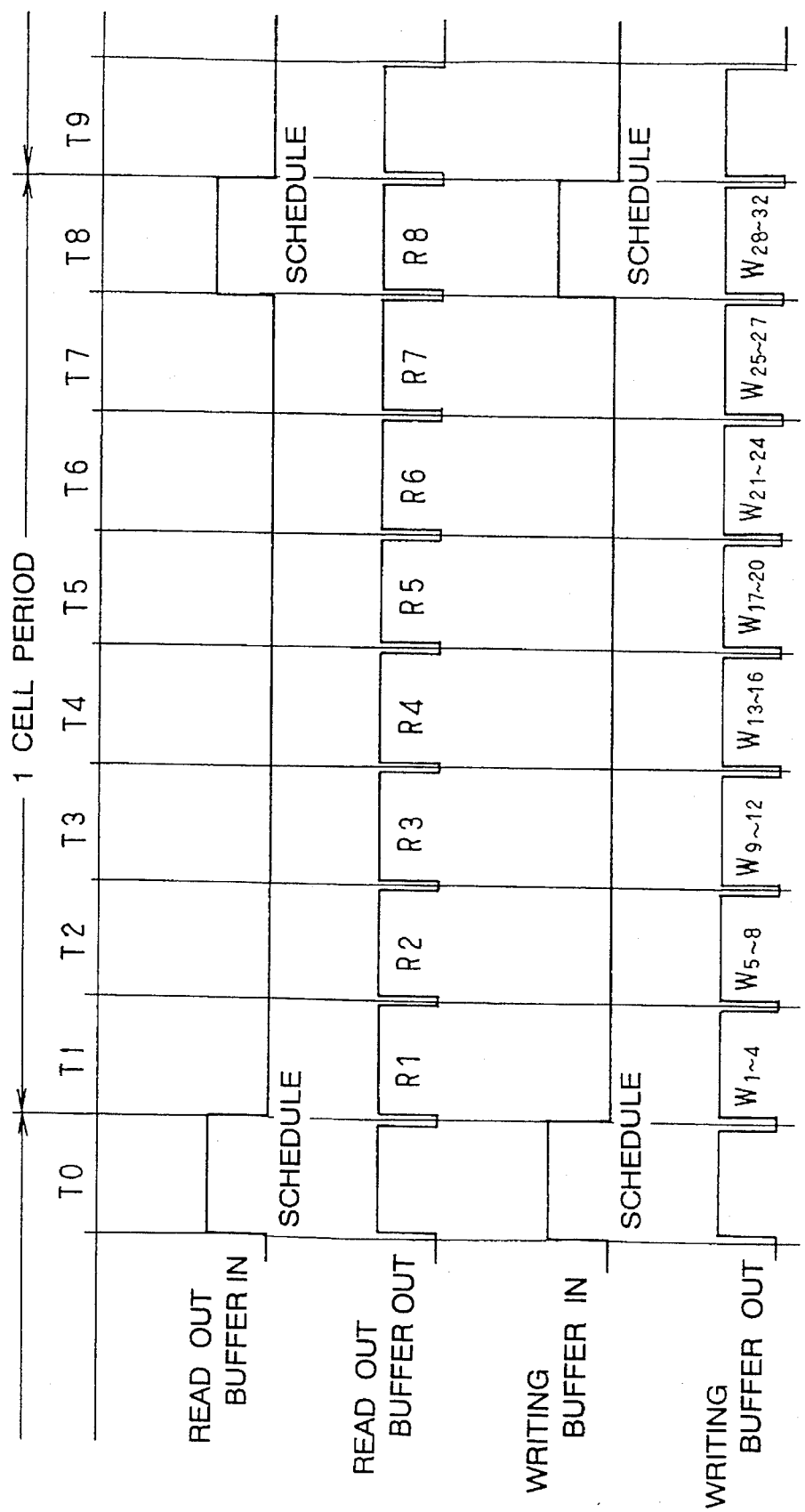
FIG. 5 shows a timing chart of a signal input and output to the schedule controller according to an embodiment of this invention.
Figure 6:
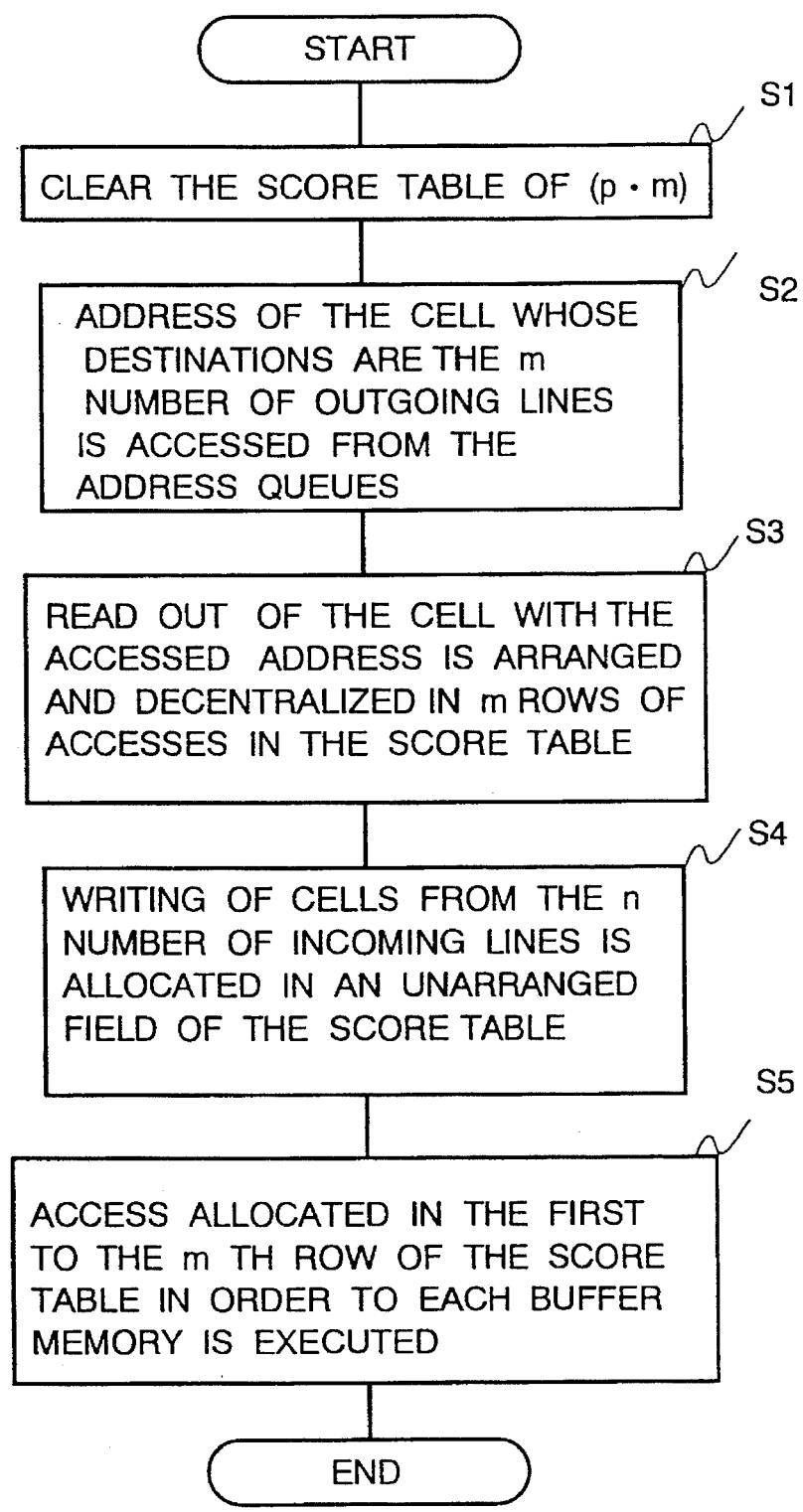
FIG. 6 shows a flow-chart of the operation of the scheduler according to an embodiment of this invention.

FIG. 5 is a timing chart of a signal input or output to the schedule controller 101. FIG. 6 is a flow-chart showing the operation of a scheduler 102. The schedule controller 101, as shown in FIG. 5, receives the information of the read out buffer ($R_1$, $R_2$, $R_3$ . . . ) and the writing buffer ($W_1$, $W_2$, $W_3$ . . . ) from the writing buffer selective circuit 16 and the read-out-buffer selective circuit 19, respectively. This input is performed at the final stage of each of the one-cell time. In FIG. 5, the input is performed at an interval of $T_0$. In the interval of $T_0$, the schedular performs scheduling based on the flow-chart as shown in FIG. 6. First, at S1, the value of each field of the score table shown in p columns and m rows is initialized with zero or space. At S2, the address information $R_1$ to $R_8$ of the cell for the m number of outgoing lines derived from the address queues is obtained. At S3, the obtained address information $R_1$ to $R_8$ are distributed and arranged in order in each row in the score table. Next, at S4, the writing information of the cell coming to the writing buffer selective circuit 16 ($W_1$, $W_2$, $W_3$ . . . ) is allocated on the unarranged field of the score table. Furthermore, at S5, the allocated accesses in the first to the mth row of the score table for each buffer memory are launched orderly row by row at each access interval to the writing buffer selective circuit 16 and the read-out-buffer selective circuit 19.

The operation at S5 is executed in access intervals $T_1$ to $T_8$ as shown in FIG. 5. For the read-out-buffer selective circuit 19, the information $R_1$ to $R_8$ is sent in order in each interval of $T_1$ to $T_8$. For the writing-buffer selective circuit 16, in each interval of $T_1$ to $T_8$, the writing information $W_1$ to $W_{32}$ is transmitted at each row in order. For example, with respect to the access interval of $T_1$, as shown in FIG. 3, the writing of the cell is performed for the buffer memories #1 to #3 and #5. On the other hand, the read out of the cell is performed for the buffer memory #4.

It is characterized in this embodiment that one-cell time is divided into a plurality of access intervals and the access is performed simultaneously for a plurality of buffer memories in one access interval. Specifically, the schedular 102 performs the scheduling by using the score board 103 in order that the read out and writing should not be overlapped for a single buffer memory.

FIG. 7 shows a general form of the score table 103 as shown in FIG. 3. The score table divides one-cell time by the number of outgoing lines m. Accordingly, a matrix of the score table has (p×m) number of fields. In (p×m) number of fields, m cells are used to be read out. Therefore, the possible write operation number is p×m−m=(p−1)m. Therefore, when the number n of incoming lines is assumed to be (p−1)m at its maximum, the cell switching apparatus comes to be able to switch the cells properly. When the concrete example as shown in FIG. 3 is calculated, the number of outgoing lines m=8. When the number of buffer memories p=5, therefore (5−1)×8=32, and the number of incoming lines n=32. Accordingly, the cell switching apparatus can perform the cell switching wherein the maximum number of incoming lines is 32 and the number of outgoing lines is 8. Namely, the number of incoming lines is excessively high, compared with the number of outgoing lines. Therefore, the schedule controller 101 performs the scheduling of the read out and writing of the cell by using the score table 103 and it is thus possible to realize the cell switching unit in a case where the number of incoming lines is excessively large compared with the conventional cell switching apparatus. By combining a plurality of cell switching apparatus as a whole unit, it comes to be able to configure a large scale cell switching system. Such a cell switching system will be described later.

In an example as shown in FIG. 7, it was assumed that all the read-out accesses and the write accesses are actually performed with the information $R_1$ to $R_m$ and $W_1$ to $W_n$. It is possible however that the actual read out and writing is not performed with the $R_1$ to $R_m$ and an idle state can be provided. When there exists the idle state which does not perform the read out or writing with the $R_1$ to $R_m$ and the $W_1$ to $W_n$, as shown in FIG. 7, it is possible that the scheduler 102 unconditionally allocates the idle state actually on the score table. In another case, when the idle state is recognized, it is possible that the scheduler 102 dose not allocate the idle state on the score table. Instead, another read out or writing operation can be scheduled. Accordingly, the further effective scheduling can be performed.

As shown in FIG. 4, the $R_1$ to $R_8$ need to correspond to the outgoing lines. The scheduler 102 therefore reads out only one cell at its maximum for a single outgoing line in one-cell time. On the other hand, it is not guaranteed that there occurs one writing of the cell to a single buffer memory. For instance, it may happen that the $W_1$ and $W_2$ shown in FIG. 7 are the writing information of the cell coming from the incoming line $1_1$ and the incoming line $1_2$, and it may be indicated that the cells should be stored in the buffer memory $11_1$ according to the writing buffer selective circuit 16. In this case, as shown in FIG. 7, the $W_1$ and $W_2$ may be allocated not on the same row but on the different rows. The scheduler 102 thus detects the contents of the writing information of the cell and allocates the information on the score table 103.

In a case where the writing information $W_1$ to $W_n$ is not allocated in order in the empty fields regularly, all the empty fields of the score table are not filled. And, there happens a case that the read out and writing are not performed in the particular intervals for the particular buffer memories.

Figure 8:
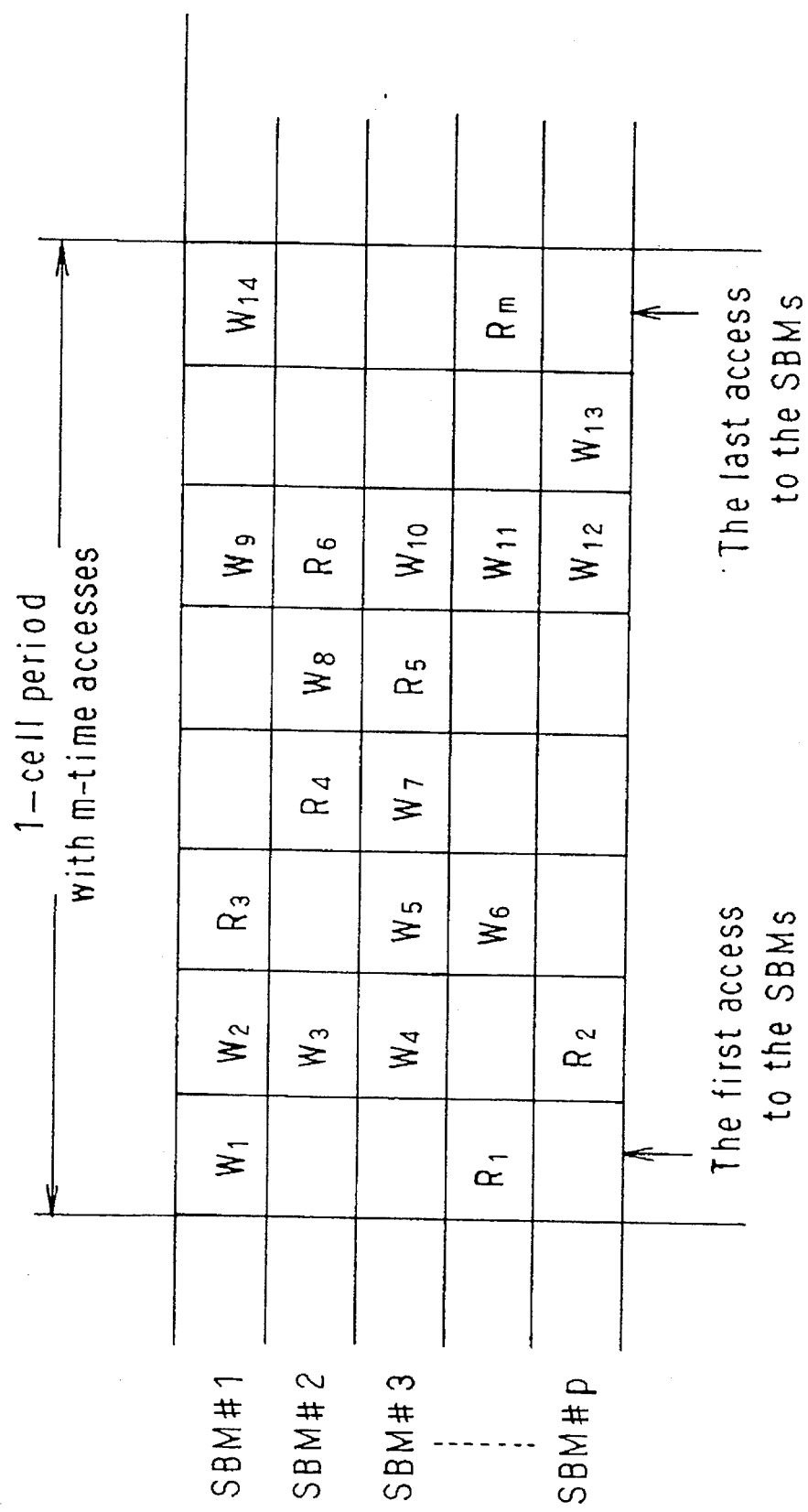
FIG. 8 shows another example of the score table so as to perform the read out and writing connecting type control according to this invention.

FIG. 8 shows one example when all of the fields of the score table 103 are not filled. There is shown that the access is not performed to some buffer memories in some access intervals. FIG. 8 shows a case where all the arrived cells to the incoming lines cannot be written on either of the buffer memories. When the arriving cell can not be written in any of the buffer memory, the cell is discarded.

Figure 9:
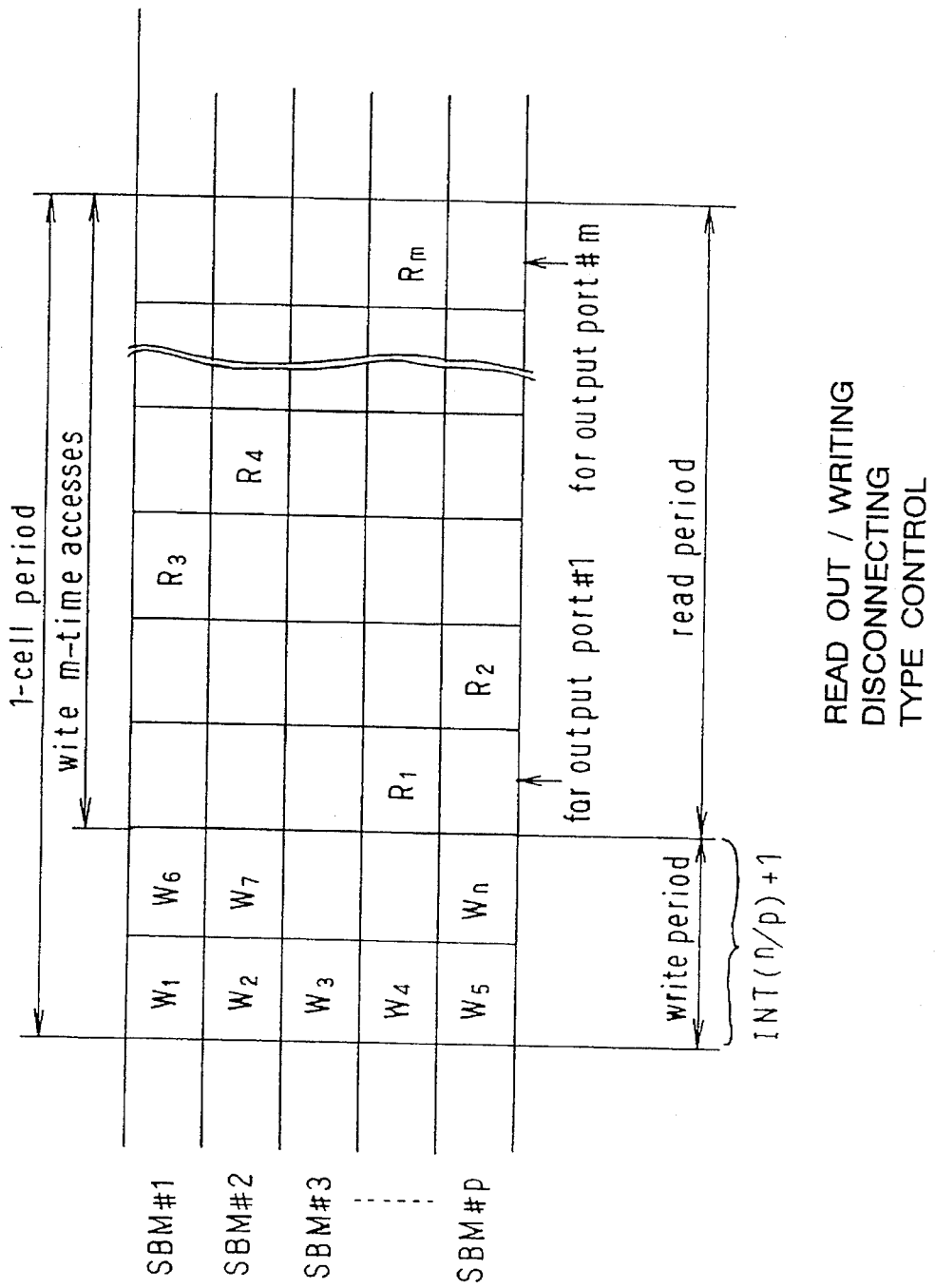
FIG. 9 shows an example of the score table so as to perform the read out and writing disconnecting type control according to this invention.

FIG. 9 shows a case where the one-cell time is divided by the larger number than the number of outgoing lines. In this example, the one-cell time is divided into (m+2). Two access intervals on the left are assumed to be the intervals dedicated to the writing operations. M number of the other access intervals are assumed to be the intervals dedicated to the read-out operations. The scheduler 102 allocates the information $W_1$ to $W_n$ to write the cells in advance from the writing-buffer selective circuit 16 on the intervals dedicated to the writing operations. The information $R_1$ to $R_m$ to read out the cells from a read-out-buffer selective circuit 19 are allocated on the other intervals dedicated to the read out operations. Thus, by dividing the score table into the intervals dedicated to the writing and the intervals dedicated to the read out operations, the writing and read out of the cells is guaranteed. For example, the minimum number of the intervals dedicated to the writing is only the quotient of (n+p) (when it is not divisible, the quotient of (n+p)+1). When the writing-buffer selective circuit 16 selects the buffer memory cyclicly in order, the buffer memory to write the cell is surely selected in order. Therefore, as shown in FIG. 9, the $W_1$ to $W_n$ are arranged in order. Thus, it is appreciated that the (n+p)+1 number of access intervals are provided. As shown in FIG. 9, all the arriving cells are written in the buffer memory by using the interval dedicated to the writing for one-cell time. Then, by reading out the cell from the buffer memory in order for the outgoing line, it is possible to write the arriving cell surely in the buffer memory as long as the buffer memory is not full. Meantime, the cell to be read out can be surely read out for the outgoing lines.

In the above-stated example, there is shown a case in which the number of divisions for one-cell time is equivalent to or more than the number of outgoing lines. As shown in FIG. 10, there can be shown a case where the number of divisions for one-cell time is smaller to the number of outgoing lines. FIG. 10 shows a case where the number of divisions x is four, whereas the number of outgoing lines m is 8. In the above-stated example, the number of divisions x is more than the number of outgoing lines m. It is therefore guaranteed that the read out of the cell is surely performed for all the outgoing lines. As shown in FIG. 10, when the number of divisions for one-cell time is smaller than the number of outgoing lines, the cells are not necessarily output for all the outgoing lines. When more than five cells are read out from a single buffer memory, for instance, four access intervals are not sufficient. Consequently, the read out of the cell should be waited for the next cell time.

For example, in FIG. 10, there is shown a case where the read out operations of the $R_1$ to $R_5$ occur for one buffer memory. The $R_1$ to $R_4$ can be allocated to each access interval and the $R_5$ is allocated to the next cell time. Thus, even though the read out of the cell for all the outgoing lines is not guaranteed for one-cell time, it is possible to perform the effective access for more than two buffer memories in the single access interval by performing the access of the read out or writing.

As clarified from the examples, the buffer memory preferably offers the access speed which can perform the read out or writing of the cell in each access interval into which one-cell time is divided. Accordingly, it is possible to obtain the cell switching apparatus which increases the number of incoming lines without increasing the access speed of the buffer memory. Thus, the number of incoming lines can be increased not only because one-cell time is divided into a plurality of access intervals but also because the scheduling is performed so as to access to a plurality of buffer memories in one access interval.

In a conventional cell switching apparatus, there was shown a case where one-cell time is divided into a plurality of intervals and the read out or the writing is performed. However, there was not a case where one-cell time is divided into a plurality of intervals and the read out and writing is simultaneously performed in one interval. Or, in the same interval, there was not a case where the read out is performed from each of the plural buffer memories. Or, in the same interval, there was not a case where the writing is performed for plural buffer memories.

In this embodiment, as clarified from the preceding embodiment, it is characterized in that time for transmitting one cell is divided into a plurality of access intervals and the access operations such as the read out or writing are simultaneously performed. Thus, without increasing the access speed, if the number of incoming lines and the number of outgoing lines are increased, it is possible to obtain the cell switching apparatus in which the switching of the cell is performed well. More specifically, in the preceding example, it is possible to obtain the cell switching apparatus which can excessively increase the number of incoming lines, compared with the number of outgoing lines.

There is shown a case of the control method when the arriving cell at an incoming line is written in one of the plurality of the buffer memories.

The following methods can be thought in a case where the arriving cell at an incoming line is written to the buffer memory.

1. The buffer memory to write the cell is selected randomly.

2. The buffer memory to write the cell is selected in order and the cells are written cyclicly.

3. The buffer memory to write the cell is selected according to the amount of cells held in the buffer memory itself. In particular, the buffer memory which stores fewer cells than others is selected.

4. As in the preceding embodiment, the buffer memory is selected so as to avoid the read out and writing of the cell simultaneously for one buffer memory. The selecting methods of the buffer memory on the above 1 to 3 have been conventionally thought. On the contrary, the method as stated on the above 4 is a new one. There follows the explanation.

Figure 11:
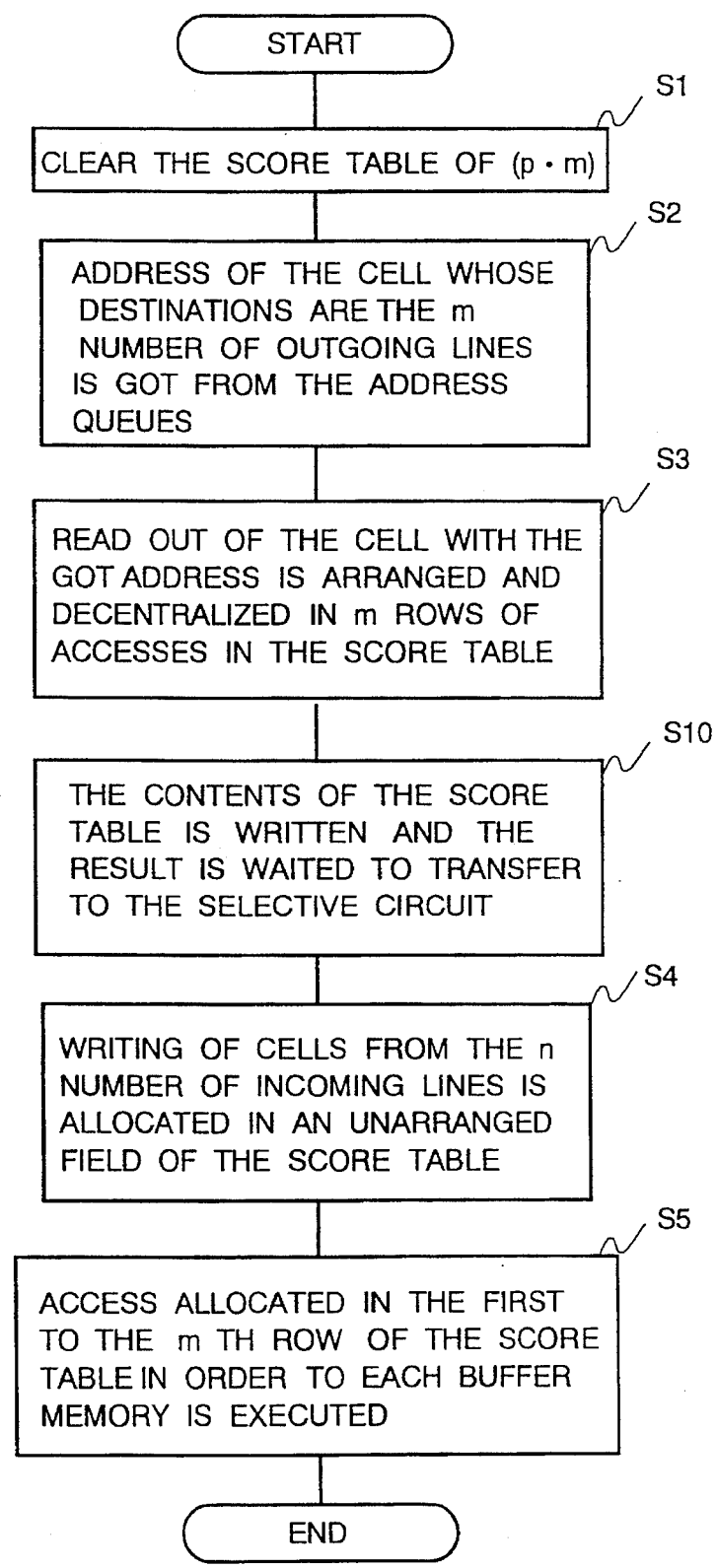
FIG. 11 shows a flow-chart of the operation of the scheduler according to an embodiment of this invention.

As in the preceding embodiment, it is desirable that the scheduling is performed in order that the read out and writing will not occur in the same access interval for the same buffer memory. Therefore, it is desirable that the scheduler 102 of the schedule controller 101 performs the scheduling according to the flow-chart as shown in FIG. 11. In the flow-chart as shown in FIG. 11, step S10 is added between S3 and S4 of the flow-chart as shown in FIG. 6. At S10, the contents of the score table in which the read out of the cell is already allocated at S3, is transmitted to the writing-buffer selective circuit 16.

Figure 12:
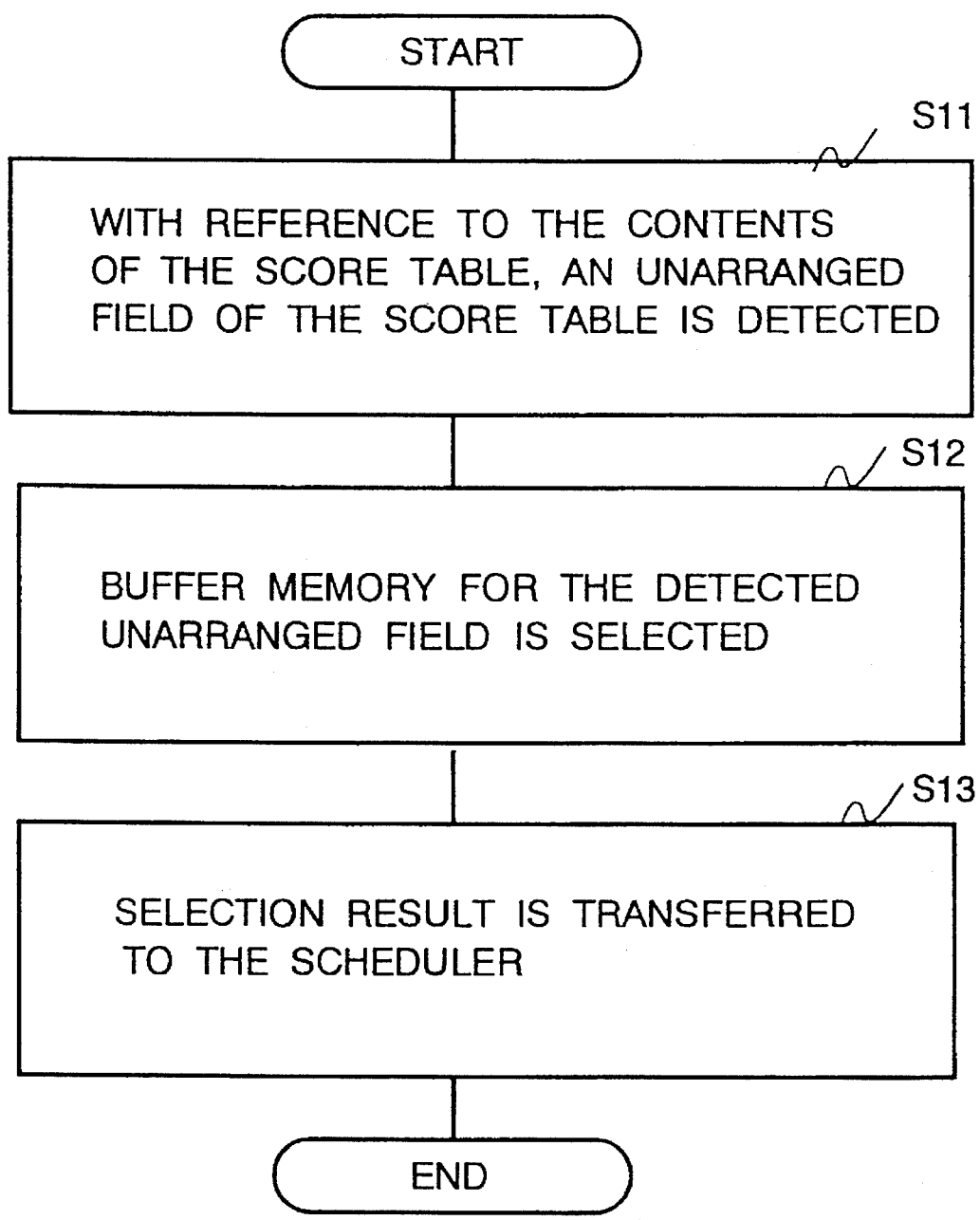
FIG. 12 shows a view of the operation of the writing buffer selective circuit according to an embodiment of this invention.

FIG. 12 is a flow-chart showing the operation of the writing-buffer selective circuit 16 to which the contents of the score table is transmitted. At S11, with reference to the received contents of the score table, unarranged fields of the score table are detected. At S12, the buffer memory in which the arriving cell is written is determined for the detected unarranged fields. At S13, the determined buffer memory is transferred to the schedule controller 101. When the operation at S13 is finished, the schedule controller 101 executes the processes at S4 and S5 as shown in FIG. 11. At S4 in FIG. 11, in the process of allocating the writing of the cell from the incoming lines in the unarranged field of the score table, the buffer memory is selected in advance in the writing-buffer selective circuit 16 so as to correspond to the unarranged field. Accordingly, the process of allocating the writing of the cell dose not overlap the operations of read out $R_1$ to $R_m$.

Thus, the writing-buffer selective circuit 16 refers to empty fields of the score table and arranges the writing buffer memory of the arriving cell. It is therefore possible that the score table can be filled efficiently with the read out and writing operations.

Embodiment 2

FIG. 13 shows a conceptional view of another embodiment of the cell switching apparatus related to this invention. In FIG. 13, the buffer memory, the incoming line space switch and the outgoing line space switch as shown in FIG. 1 are shown. The other parts are equivalent to those in FIG. 1 and not shown in FIG. 13. In FIG. 13, the difference from FIG. 1 is that the buffer memory has a plurality of ports. Specifically in FIG. 13, the buffer memory has a write port and a read port. The buffer memory in FIG. 1 is a single port memory. If the buffer memory has the single port, when the buffer memory performs writing, the read out cannot be performed. When the buffer memory performs the read out, the writing can not be performed. Accordingly, the scheduler 102 exclusively controlled a single buffer memory by using the score table 103 in order that the read out and writing should not overlap. However, as shown in FIG. 13, when the buffer memory has two ports, the read out and writing can be simultaneously performed.

FIGS. 14A and 14B show an example of the score tables when the buffer memory shown in FIG. 13 is utilized. A reading score table 13a and a writing score table 13b are provided. In the reading score table, information $R_1$ to $R_m$ to read out the cell from the buffer memory are arranged orderly in each row. The fields except for the ones in which the $R_1$ to $R_m$ are allocated remain empty. On the other hand, the writing score table 13b schedules the writing information coming from the writing-buffer selective circuit 16. Since the writing score table is dedicated to the writing, unlike the preceding Embodiment 1, the $R_1$ to $R_m$ are not allocated in advance. Therefore, the scheduler 102 can allocate the writing information of the cell at the optional position for the writing score table 13b. The maximum number is (p×m). The write port shown in FIG. 13 writes the arriving cells in the buffer memory according to the schedule of the writing score table as shown in FIG. 14B. On the other hand, the read pore performs the read out of the cell according to the schedule of the reading score table 13a shown in FIG. 14A. Herein, in the same access interval, when the read out and writing is performed for the same buffer memory, the access can be performed in parallel because the write port and the read port can operate independently.

Herein, the writing from the write port and the read out from the read port do not come to be the same address. Because the read out is performed from the address in which the cell is recorded in advance, whereas the writing is performed for the address in which the cell is not written yet. The management of these addresses is performed according to the memory controllers $12_1$ to $12_p$ and the buffer controller 15.

Figure 15:
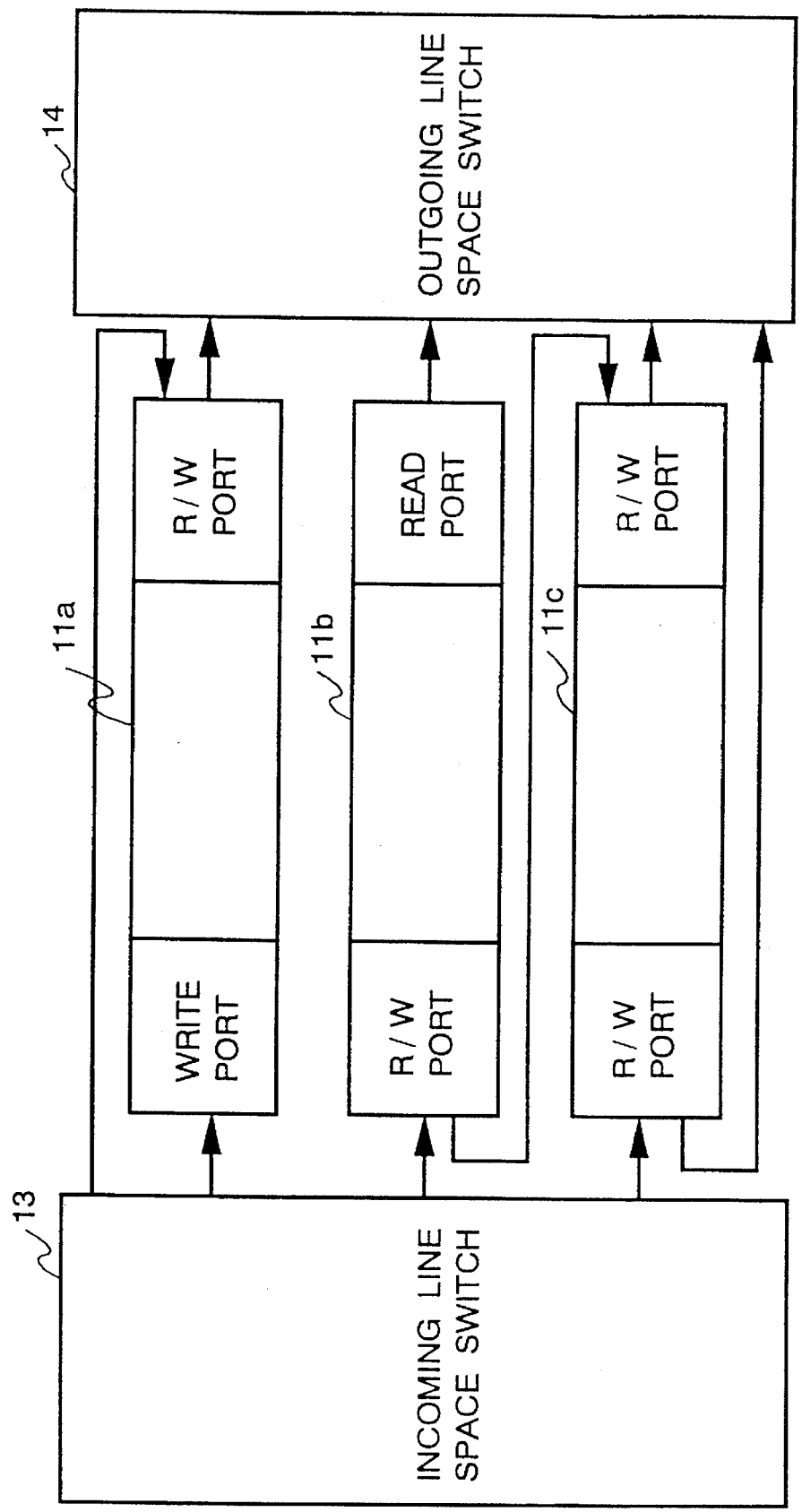
FIG. 15 shows another example of the dual port buffer memory according to this invention.

FIG. 15 shows a view in a case where the buffer memory according to the embodiment has a plurality of ports. The buffer memory 11a has a write port and a read/write port. Accordingly, for the buffer memory 11a, it is possible to write two cells simultaneously by using both of the write port and the read/write port. On the other hand, the buffer memory 11b has a read/write port and a read port. Therefore, it is possible to read out two cells simultaneously from the buffer memory 11b by using the read/write port and the read port. The buffer memory 11c has two read/write ports. Then, for the buffer memory 11c, the simultaneous writing or read out of the two cells can be implemented. Thus, by providing a plurality of input and output ports for the buffer memory, it is possible to read out and write a plurality of cells without increasing the access speed of the buffer memory.

Figure 16A:
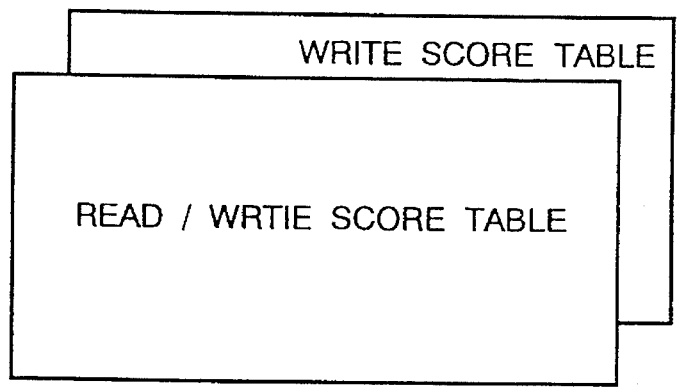
FIG. 16A shows a score table for buffer memory 11a in case that the dual port buffer memory is used.

In case of using the buffer memory 11a as shown in FIG. 15, a score table shown in FIG. 16A is available. That is, as a score table for the buffer memory 11a, a read/write score table as shown in Embodiment 1 and the writing score table as shown in FIG. 14B are utilized. The read/write score table corresponds to the read/write ports, while the writing score table corresponds to the write port.

Figure 16B:
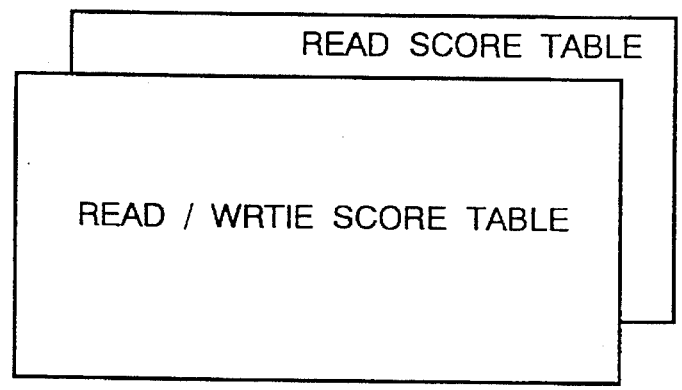
FIG. 16B shows a score table for buffer memory 11b in case that the dual port buffer memory is used.

Likewise, as shown in FIG. 16B, for the buffer memory 11b, the read/write score table and the read score table are used. The read/write score table corresponds to the read write ports of the buffer memory 11b and the read score table corresponds to the read port.

Figure 16C:
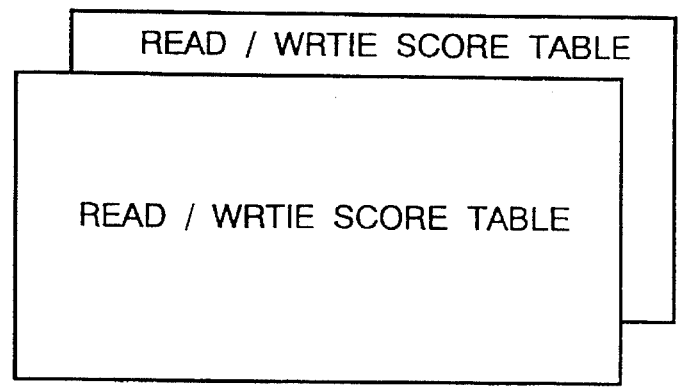
FIG. 16C shows a score table for buffer memory 11c in case that the dual port buffer memory is used.

As shown in FIG. 16C, read/write score table is provided for each of the read/write ports, in the buffer memory 11e.

As shown in FIG. 13, there was shown a case where the buffer memory is composed of the dual port memory. However, it is appreciated that the buffer memory is composed of three ports or four ports. In this case, it is possible that the scheduler 102 schedules the access to the memory by providing three or four score tables corresponding to each port as shown in FIGS. 16A, 16B, or 16C.

Embodiment 3

Figure 17A:
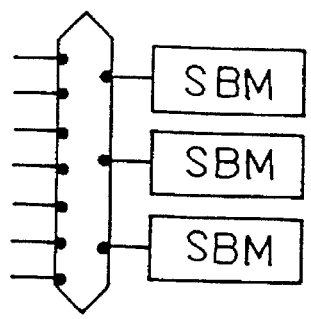
FIG. 17A shows a bus configuration of an incoming line space switch according to an embodiment of this invention.
Figure 17B:
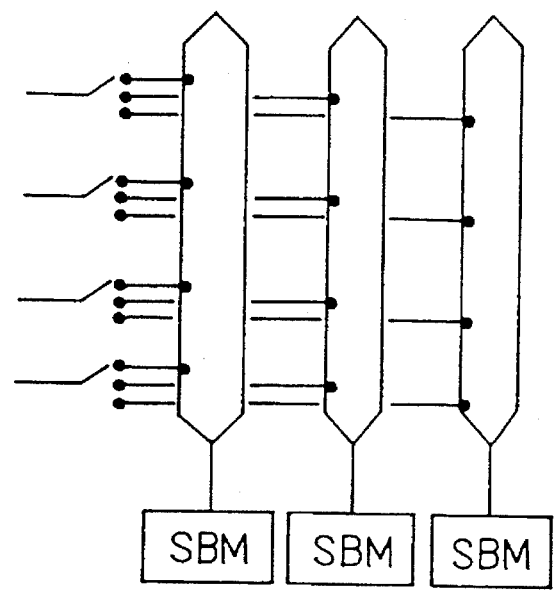
FIG. 17B shows another bus configuration of an incoming line space switch according to this invention.

FIGS. 17A and 17B show configuration examples of the incoming line space switch 13 (or, outgoing line space switch 14). FIGS. 17A and 17B show cases where the incoming line space switch 13 is composed of a bus. By adopting a bus configuration, incoming line space switch (and outgoing line space switch) with a simplified configuration will be implemented. FIG. 17A shows a case of a centralized bus configuration and FIG. 17B shows a case of a decentralized bus configuration.

Embodiment 4

Figure 18:
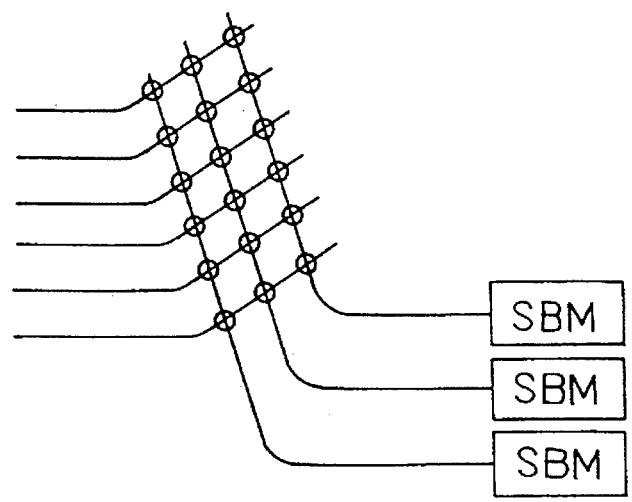
FIG. 18 shows another example of the incoming line space switch according to this invention.

FIG. 18 shows another example of the incoming line space switch 13 (and the outgoing line space switch 14). In FIG. 18, there is shown a case where a cross point switch is used. By using the cross point switch, it is possible that the cell is written independently in the buffer memory at a different timing among the incoming lines.

Embodiment 5

Figure 19:
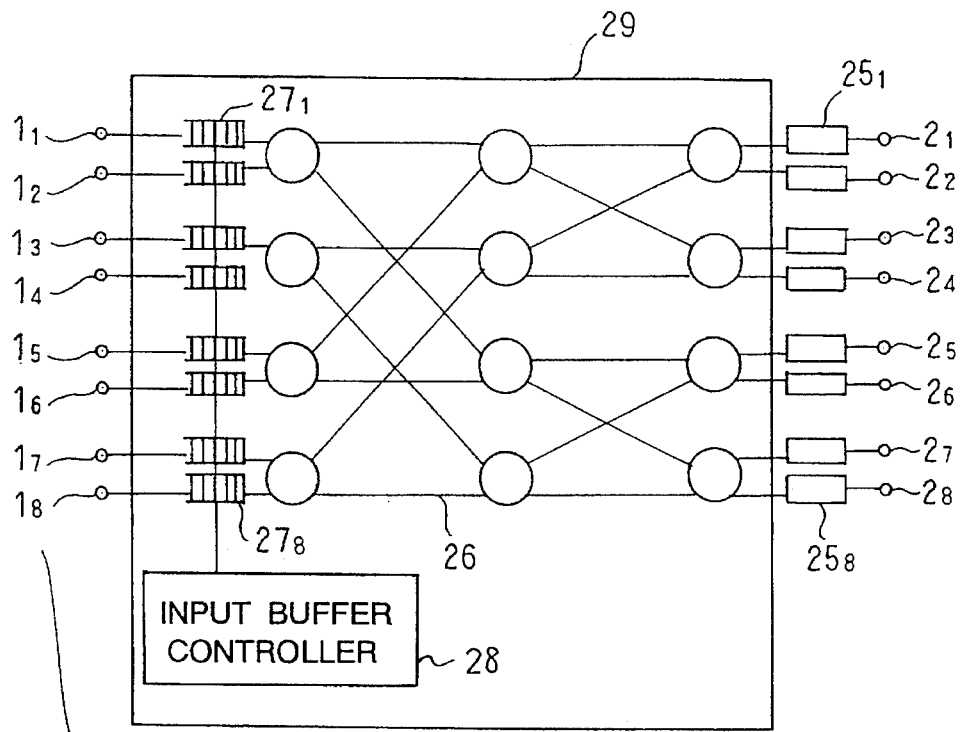
FIG. 19 shows another example of the incoming line space switch according to this invention.

FIG. 19 shows another example of the incoming line space switch. In FIG. 19, there is shown a case where a Banyan switch is used. By using the Banyan switch, the high-speed operation can be implemented. In addition, the sort network like a Batcher network can be added to the front stage of the Banyan switch.

Embodiment 6

Figure 20:
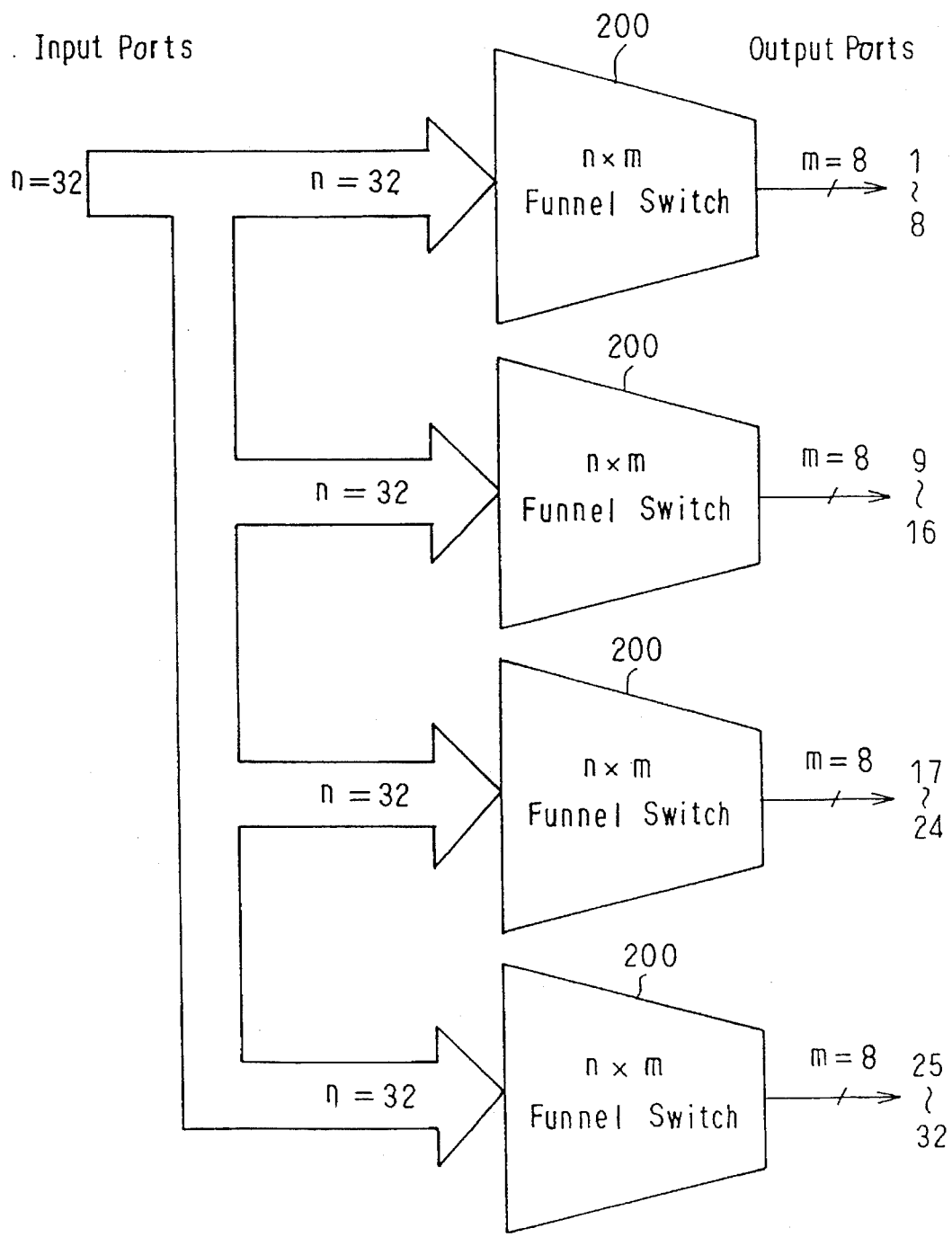
FIG. 20 shows a block diagram of a line concentration type shared multi buffer ATM switch.
Figure 22A:
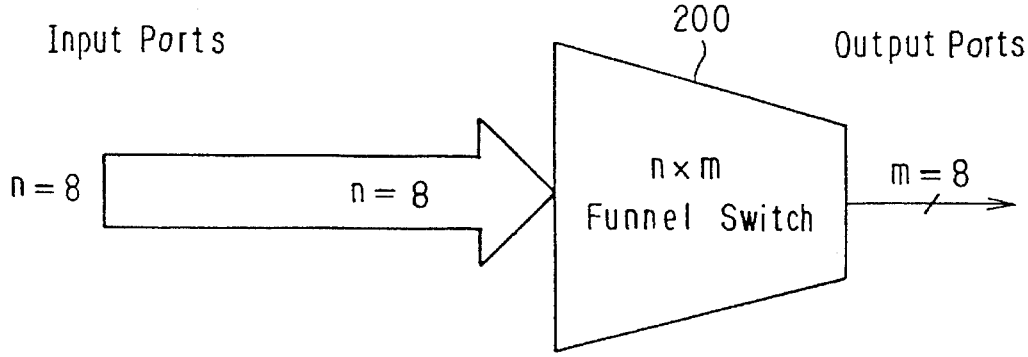
FIG. 22A shows a view of an 8×8 switch according to an embodiment of this invention.
Figure 22B:
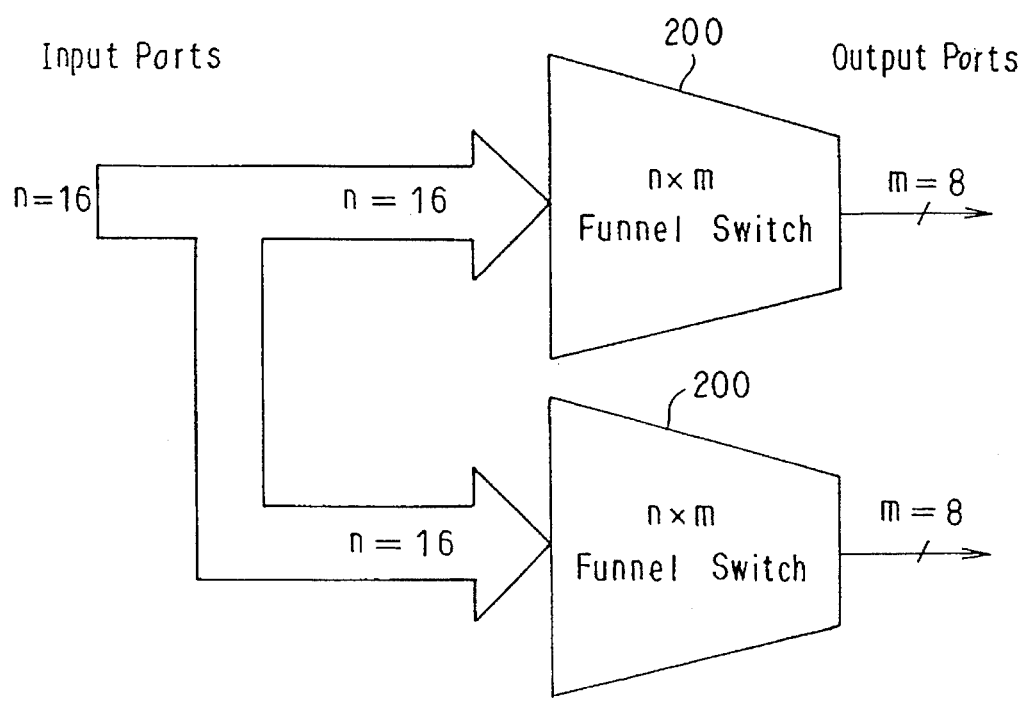
FIG. 22B shows a view of a 16×16 switch according to an embodiment of this invention.
Figure 23:
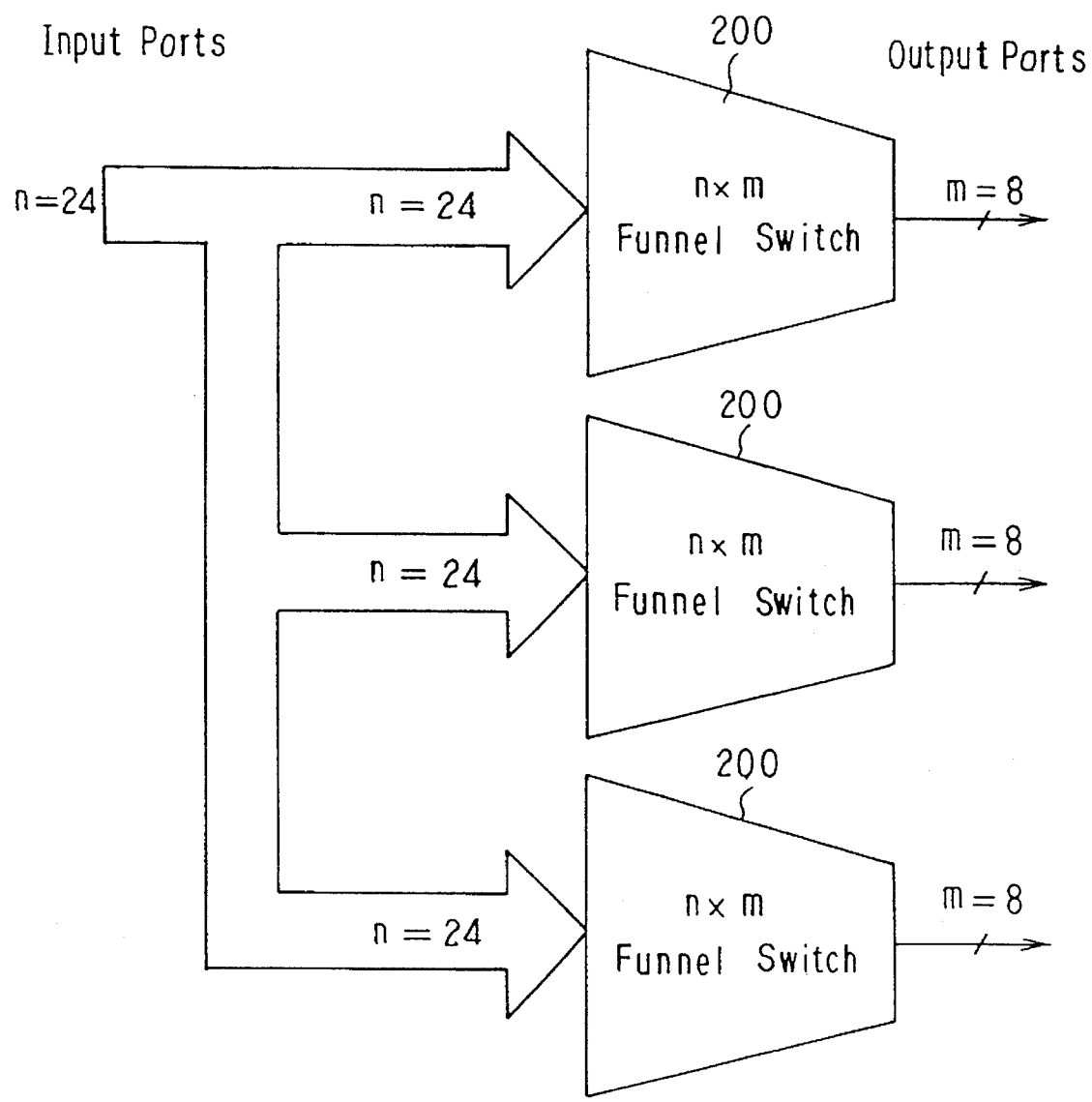
FIG. 23 shows a view of a 24×24 switch according to an embodiment of this invention.

FIG. 20 is a conceptional view when a large-scale cell switching system is configured by using the above-stated cell switching apparatus. In the figure, a plurality of cell switching apparatuses 200 is provided. In this example, four cell switching apparatuses 200 are arranged in parallel. FIG. 21 shows a relationship table between the maximum number of incoming lines calculated from the number of outgoing lines and the number of buffer memories. In the condition that the number of outgoing lines is fixed to 8, if the number of buffer memories p is changed, the maximum number of incoming lines n is changed as shown in FIG. 21. An example shown in FIG. 20 shows a case where four cell switching apparatuses are arranged. Each of four cell switching apparatuses has 8 outgoing lines (m=8), 5 buffer memories (p=5), and 32 incoming lines (n=32) as shown in the first line of the relationship table in FIG. 21. FIG. 20 shows the maximum configuration when the cell switching apparatus has 8 outgoing lines (m=8) and 5 buffer memories (p=5). FIGS. 22A, 22B, and 23 show the minimum configuration, the second configuration and the third configuration, respectively. In FIGS. 22A, 22B and 23, one, two or three cell switching apparatuses are arranged respectively. Each of the cell switching apparatuses 200 utilized in this configuration are totally the same. By arranging a plurality of the same ones, the cell switching systems of different scales, such as 8×8, 16×16, 24×24, and 32×32, can be realized.

Figure 24:
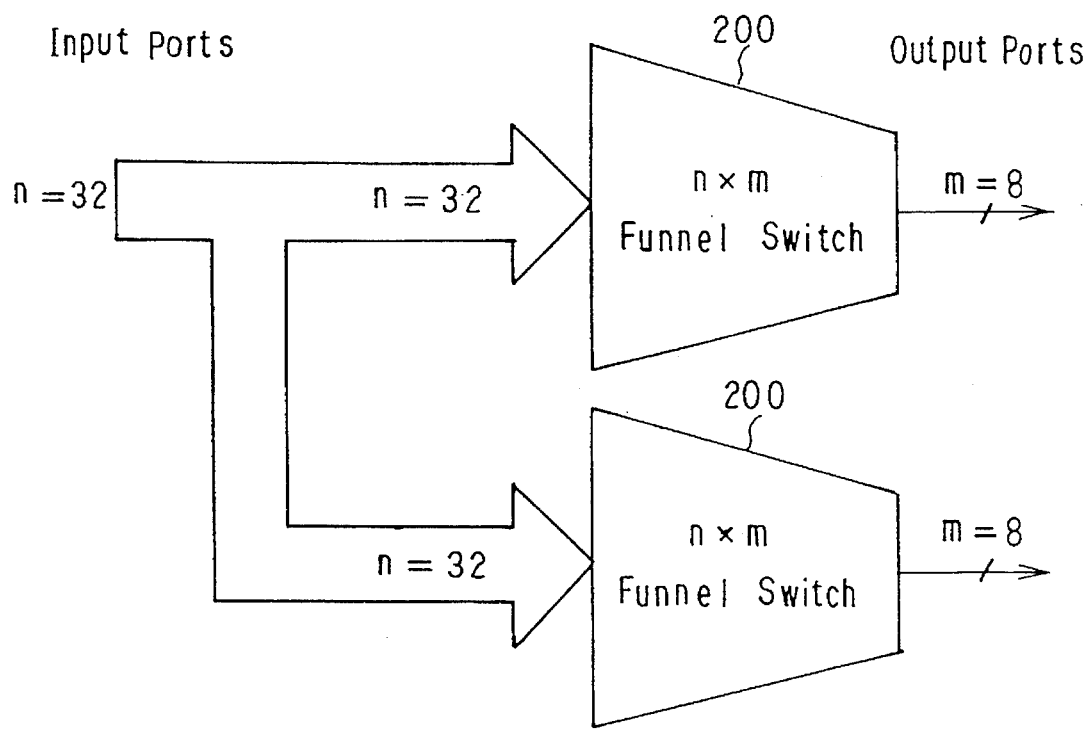
FIG. 24 shows a view of a 32×16 switch according to an embodiment of this invention.

In the preceding example, there is shown the cell switching system whose number of incoming lines equals to the number of outgoing lines. As shown in FIG. 24, it is possible to configure the system whose number of incoming lines is different from the number of outgoing lines by arranging a plurality of cell switching apparatuses 200.

The difference between the cell switching apparatus used in these system and the above-stated embodiment is that the arriving cells are not necessarily transmitted to the outgoing lines in the cell switching apparatus, in FIG. 20, for instance, in the first cell switching apparatus 200, all the cells are coming from the 32 number of incoming lines. However, only the cell switching of the cell whose destinations are the first to the eighth outgoing lines is implemented. Accordingly, only the cells for the first to eighth outgoing lines are selected among the arrived cells. Then, the other cells, i.e., the cells for the ninth to the thirty-second outgoing lines are discarded in the first cell switching apparatus 200. Likewise, in the second cell switching apparatus, only the cells for the ninth to the sixteenth outgoing lines are selectively switched. Then, the cell whose destinations are the first to the eighth and the seventeenth to the thirty second outgoing lines are discarded in the second cell switching apparatus. Such process of discarding is executed in the header processing circuit or the writing-buffer selective circuit.

With reference to FIGS. 25 to 28, there is shown a explanation of the buffer size evaluation of line concentration type of shared multi buffer ATM switch. Here, when a 32×32 ATM switch is assumed to be a model and the F (n.b., F·m=32) number of 32×m unit switches are utilized whereas F is the number of the unit switches (also called as the funnel switches) and m is the number of outgoing lines, the characteristic of the cell loss probability by computer simulation is shown. The buffer size required to attain a certain cell loss probability is examined.

There follows an explanation of the simulation model. Traffic is given randomly to all the incoming lines. The offered load rate $\tau$ is assumed to be 0.95. The destinations of the cells are chosen with the uniform probability for all the outgoing lines.

The configuration of the 32×32 ATM switch is as shown in FIG. 25. When F=1, buffers are shared among all the 32 outgoing lines. This is a completely shared-buffering type ATM switch, which has only one buffer in the switching system. When F=2, there are two switches of 32×16, the buffers are shared by every 16 outgoing lines. When F=32, the buffer is divided corresponding to each outgoing line. This is an output-buffering type ATM switch, which has separate output buffers for corresponding outgoing lines.

Figure 26:
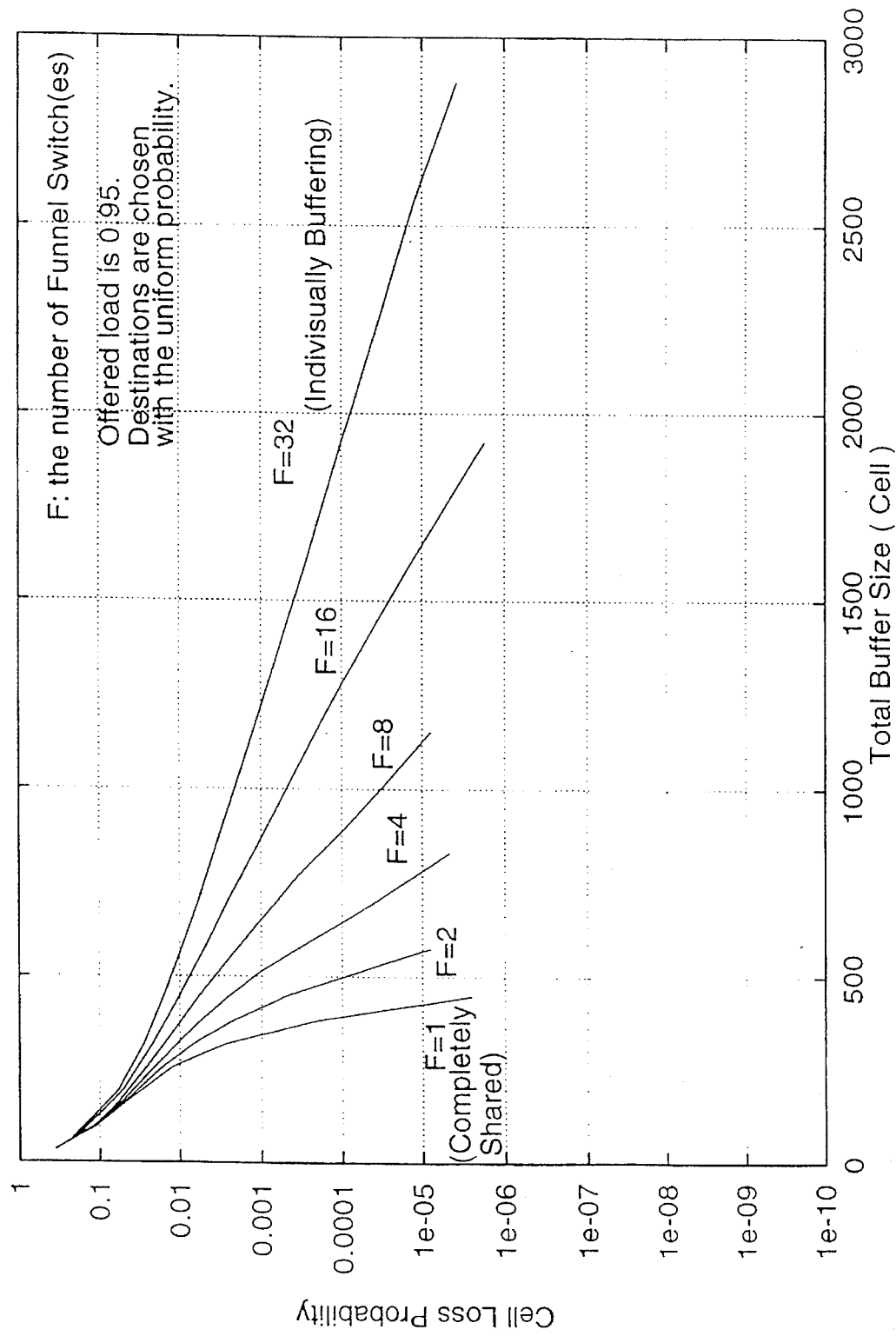
FIG. 26 shows one example of the evaluation of the cell switching system according to this invention.

FIG. 26 shows characteristics of the cell loss probability. FIG. 26 shows a relationship between the number of buffers and the cell loss probability. As F decreases, the cell loss probability is proved to be improved according to the effect of sharing the buffer.

The following is an examination as to the buffer size.

Figure 27:
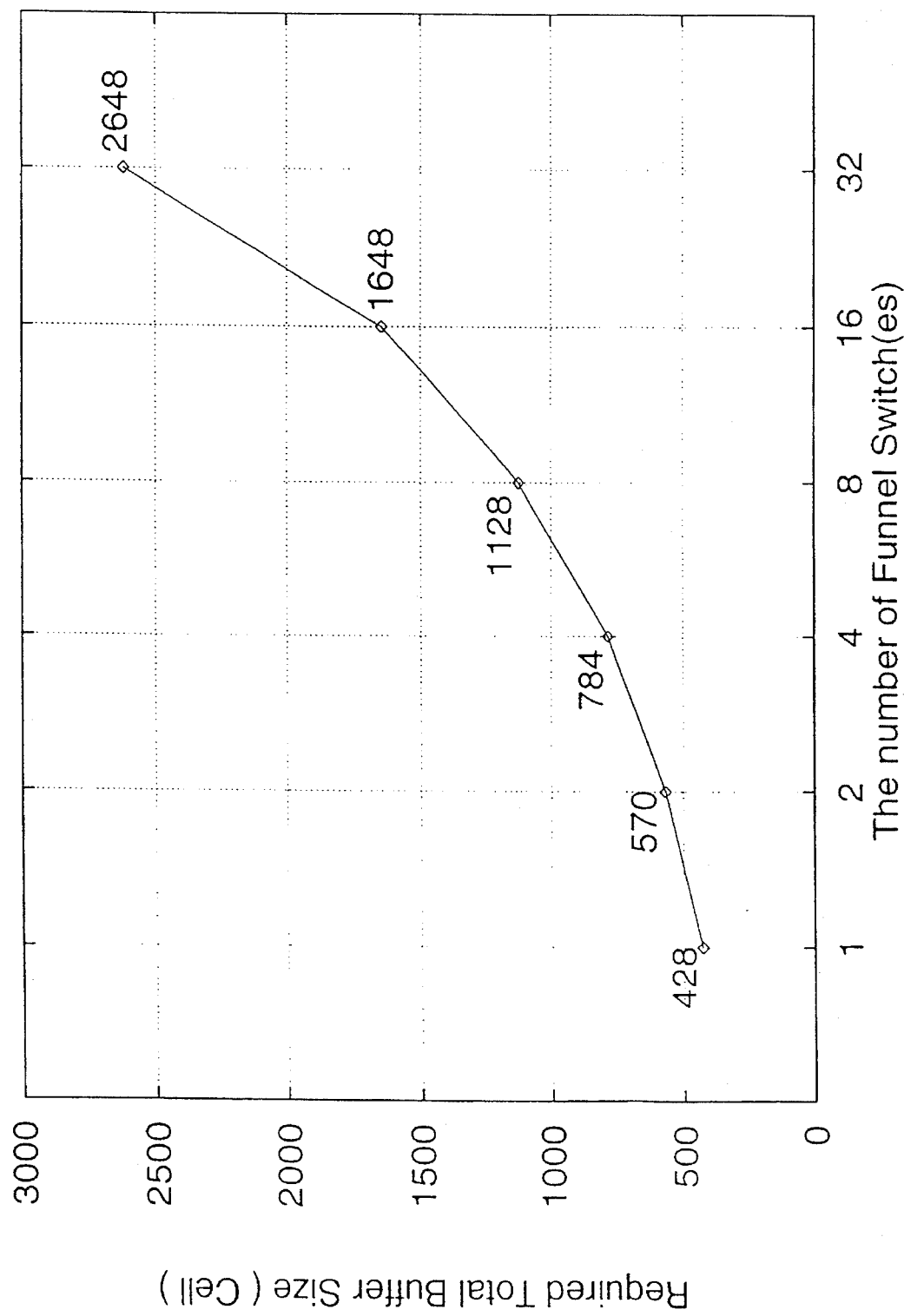
FIG. 27 shows one example of the evaluation of the cell switching system according to this invention.
Figure 28:
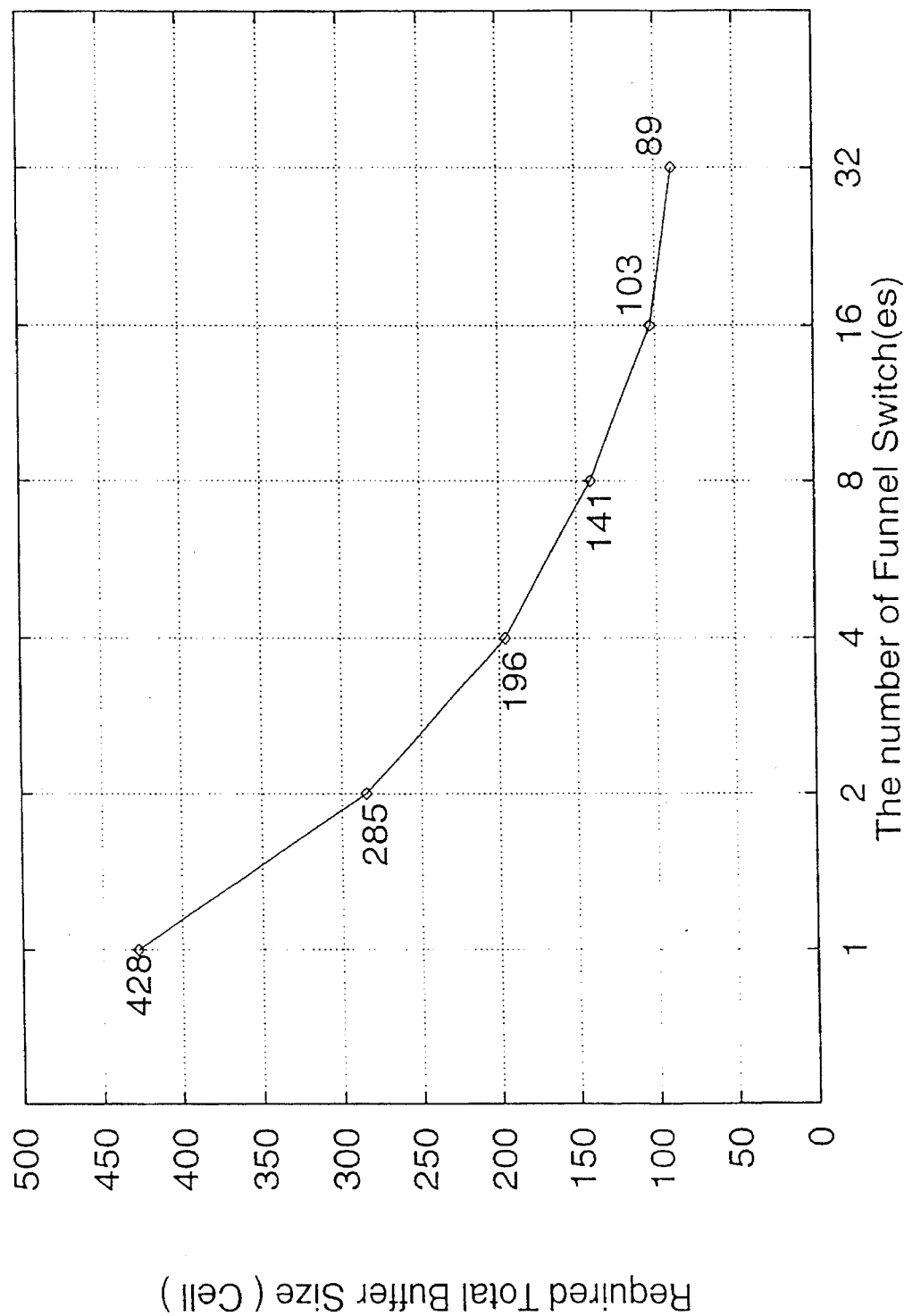
FIG. 28 shows one example of the evaluation of the cell switching system according to this invention.
Figure 29:
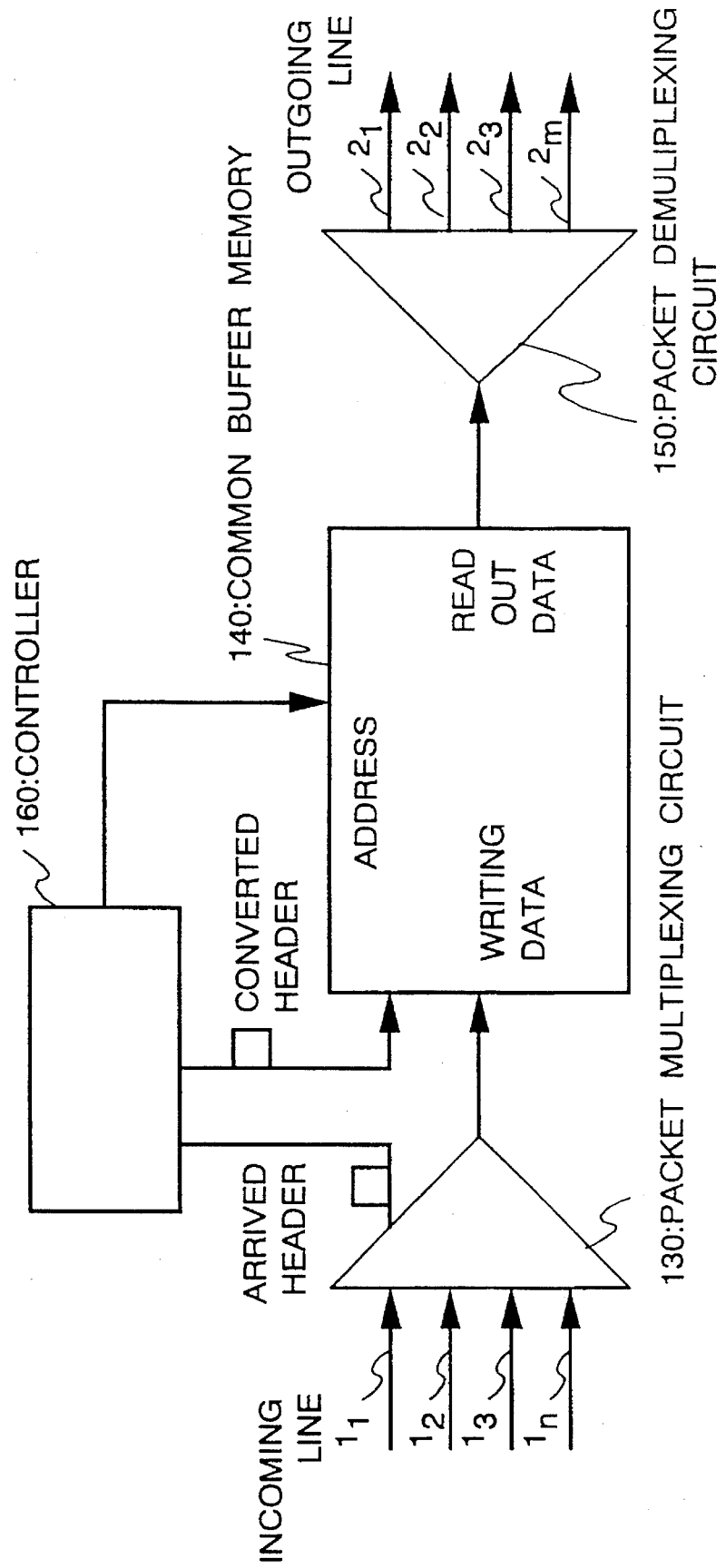
FIG. 29 shows a conventional cell switching apparatus of a conventional shared buffer memory type.
Figure 30:
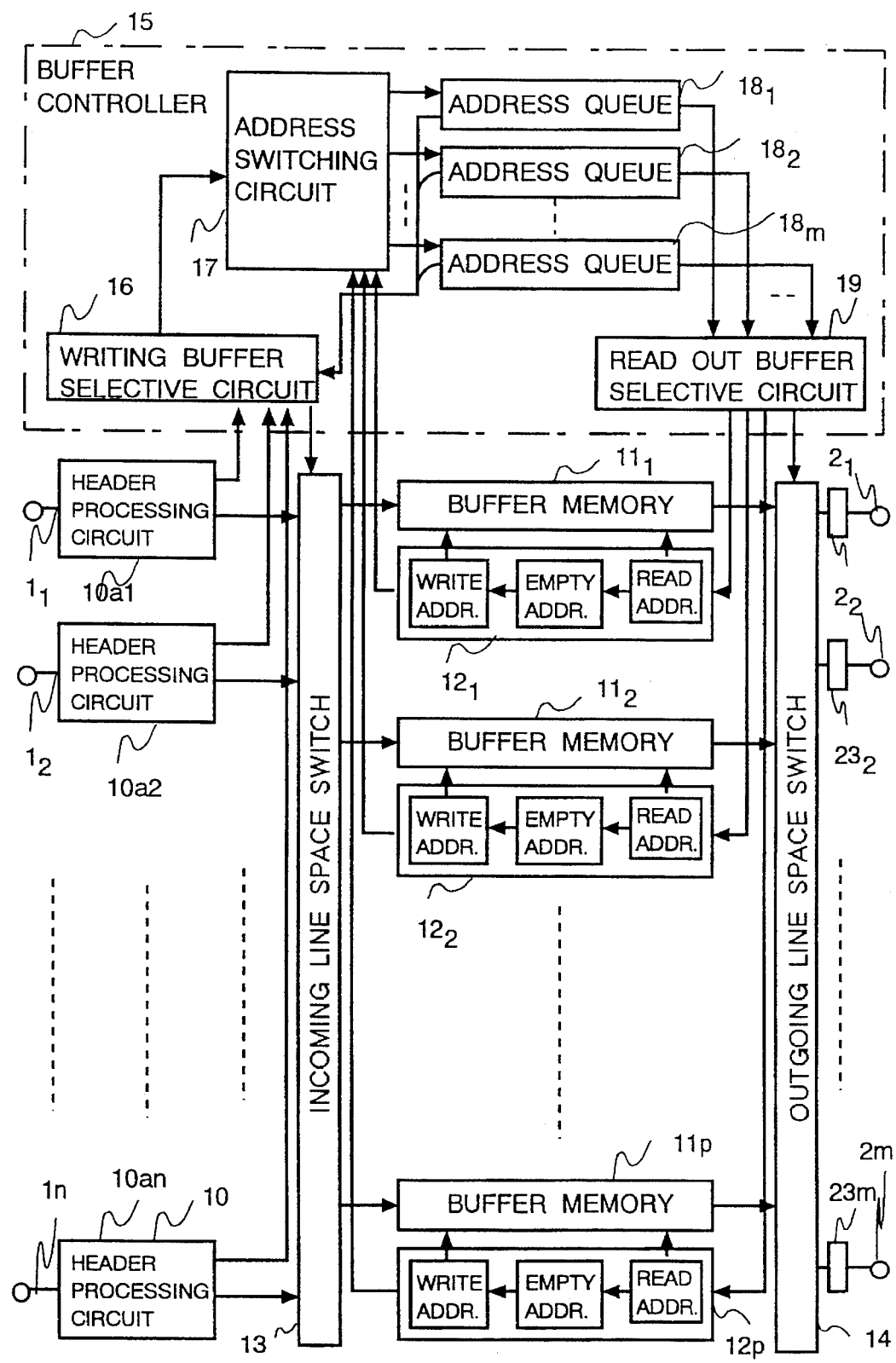
FIG. 30 shows a block diagram of a conventional cell switching apparatus.
Figure 33:
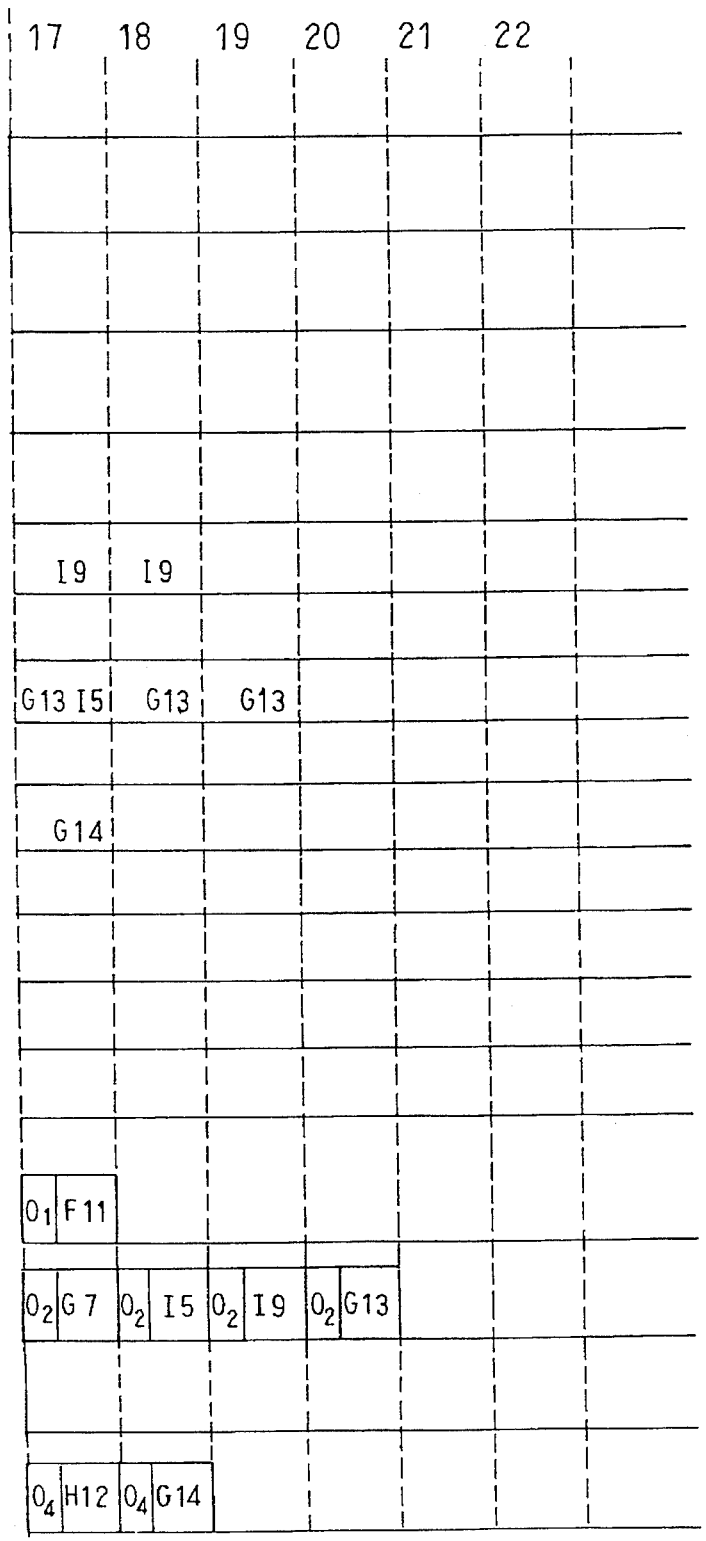
FIG. 33, which is a continuation of FIG. 32, shows a timing chart of a timing point of the signal in each part of a conventional cell switching apparatus.
Figure 35:
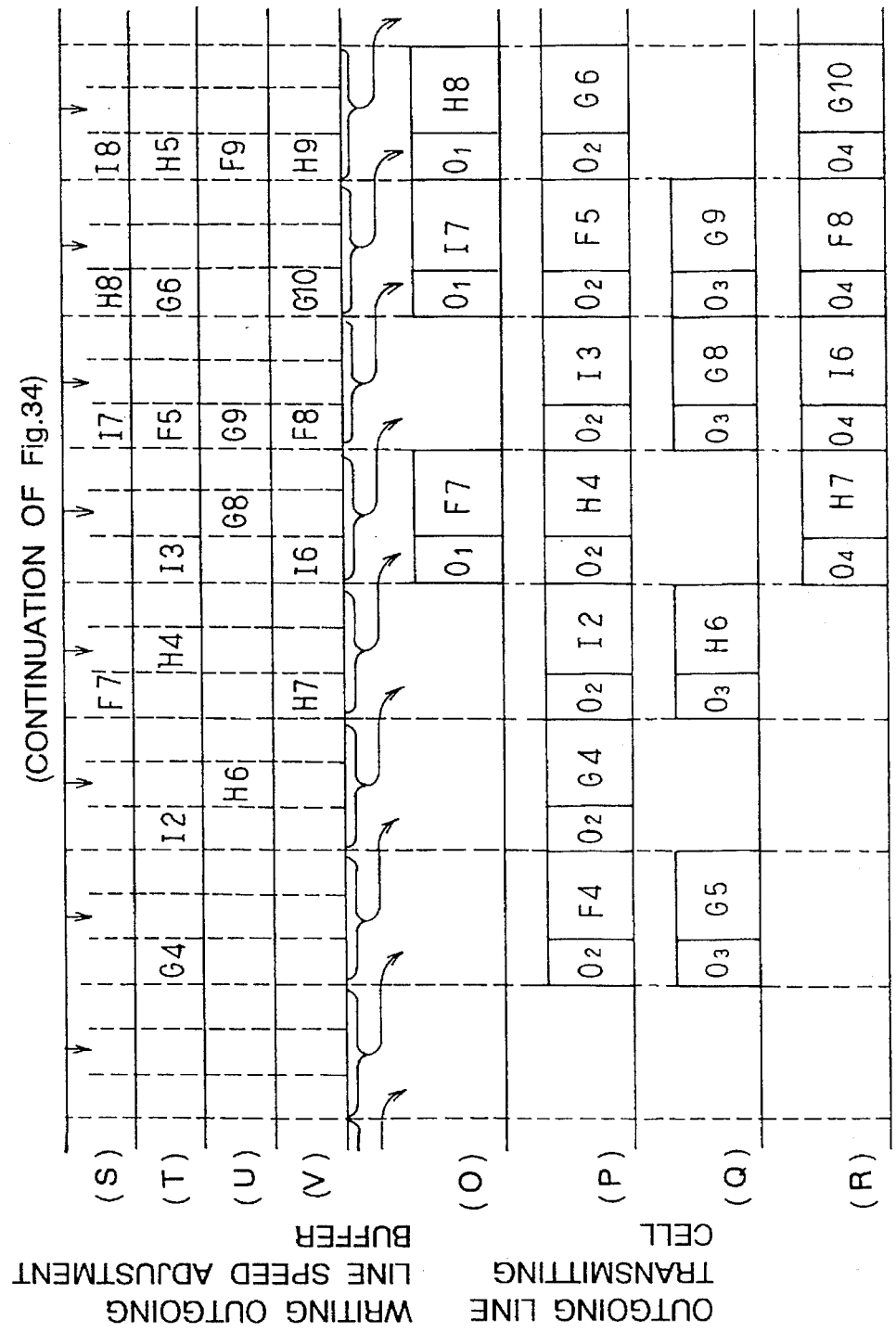
FIG. 35, which is a continuation of FIG. 34, shows a timing chart of a timing point of the signal in each part of a conventional cell switching apparatus.
Figure 36:
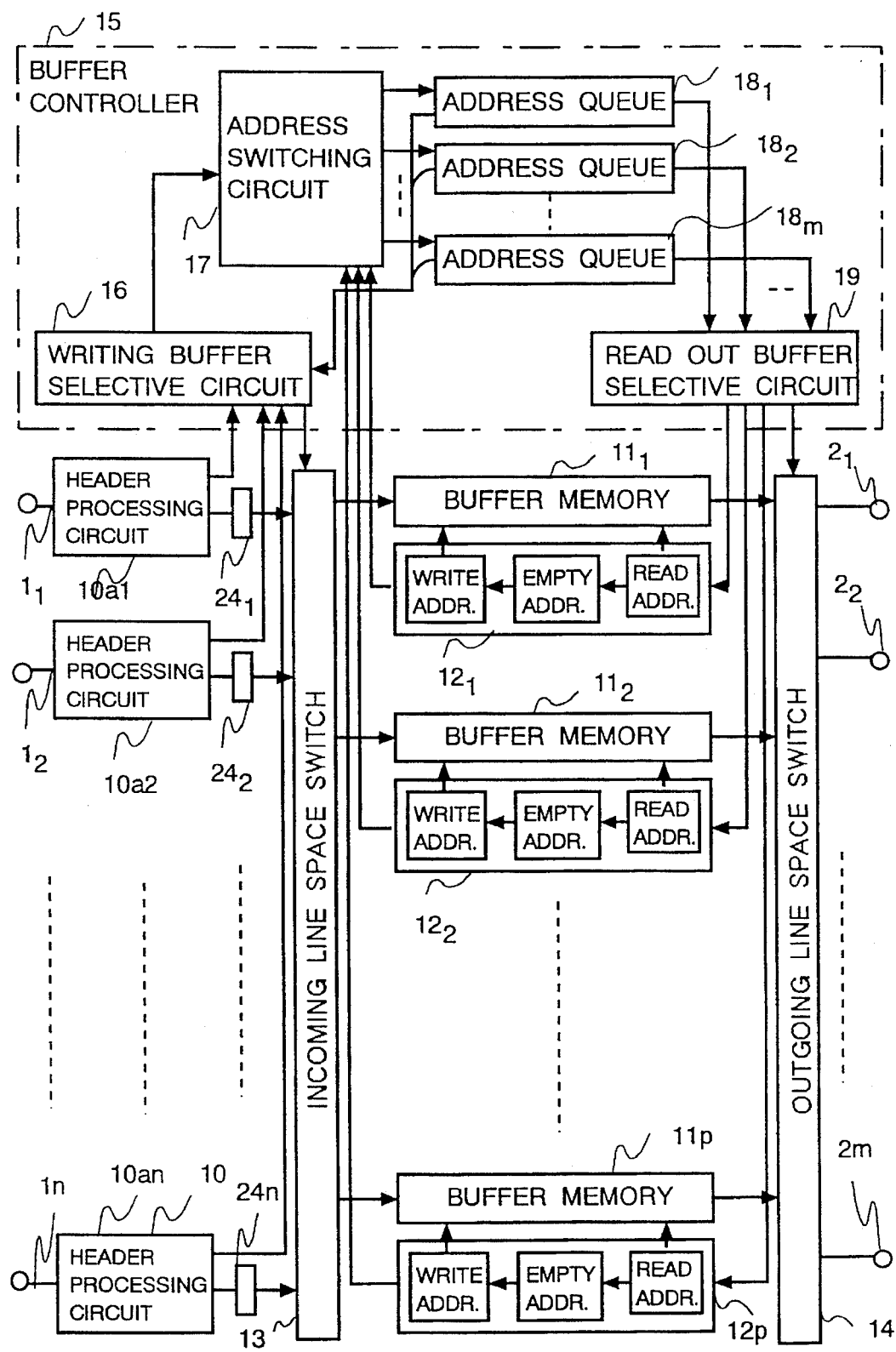
FIG. 36 shows a block diagram of a conventional cell switching apparatus.

FIG. 27 shows an example of a total buffer size required to attain the cell loss probability $10^{-5}$. In case of F=1, it is possible to attain the cell loss probability by using the least number of buffers. When $F \geq 4$, the required number of buffers gradually increases. On the other hand, when F=16 or 32, the number of buffers excessively increases. In FIG. 28, the total buffer size are shown for each of the unit switch. As the value of F approaches to 1, the amount of buffers to be dedicated in the unit switch excessively increases. Therefore, when it is difficult to configure the shared buffer by a single unit switch with respect to the amount of buffer, it is possible to configure the ATM switch by arranging a plurality of small unit switches such as 32×16 or 32×8 ATM switches. Accordingly, it is possible for ATM switch to keep the sharing effect of buffers and excel in the extensibility.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A cell switching apparatus comprising:

a plurality of incoming lines for receiving a cell having data and a header that includes destination information;

a plurality of outgoing lines, the cell being transmitted from a selected outgoing line of the plurality of outgoing lines according to the destination information indicated by the header, during a predefined one cell time;

a plurality of header processing circuits, connected to each of the incoming lines, for selecting the selected outgoing line according to the destination from the header of the cell input from the incoming line;

a plurality of buffer memories, the cell being written to a selected buffer memory of the plurality of buffer memories by indicating an address, and which is possible to read out the cell, without relating to a writing order of any other cells stored in the selected buffer memory, by indicating the address;

an incoming-line space switch for connecting the header processing circuits to the buffer memories selectively;

an outgoing-line space switch for connecting the buffer memories to the outgoing lines selectively; and, a buffer controller for controlling the incoming-line space switch and selecting the selected buffer memory in which the cell is written, the buffer controller being constructed and arranged to both read a first cell from one of the plurality of buffer memories and to write a second cell to said one of the plurality of buffer memories during said predefined one cell time, the buffer controller further controlling the outgoing-line space switch so as to transmit the cell to the selected outgoing line, and wherein the cell is transmitted from the outgoing line.

2. The cell switching apparatus of claim 1, wherein the buffer controller is constructed and arranged to divide one cell time into a plurality of access intervals and control the buffer memory, the incoming line space switch and the outgoing line space switch so as to read a cell that is stored in one of the plurality of buffer memories during each of the plurality of access intervals.

3. The cell switching apparatus of claim 1, wherein the buffer controller is constructed and arranged to divide one cell time into a plurality of access intervals and control the buffer memory, the incoming line space switch and the outgoing line space switch so that a read of a cell from one of the plurality of buffer memories does not overlap with a write of a cell to the one of the plurality of buffer memories during any one of the plurality of access intervals.

4. The cell switching apparatus of claim 1, wherein the buffer controller is constructed and arranged to divide one-cell time into a plurality of access intervals and control the buffer memory, the incoming line space switch and the outgoing line space switch so as to give a preference to a write of a cell when a read out and the write overlaps for the same buffer memory in one of the plurality of access intervals.

5. The cell switching apparatus of claim 1, wherein the buffer controller is constructed and arranged to divide one-cell time into a plurality of access intervals wherein a number of the access intervals is more than a number of outgoing lines.

6. The cell switching apparatus of claim 5, wherein the buffer controller is constructed and arranged to read a cell during each of the plurality of access intervals in an order corresponding to an order of the outgoing lines from the buffer memory, and control the buffer memory, the incoming-line space switch and the outgoing-line space switch so as to write a cell in at least one of the buffer memories except For the buffer memory from which the cell is read during each of the plurality of access intervals.

7. The cell switching apparatus of claim 5, wherein the buffer controller is constructed and arranged to read a plurality of cells in an order corresponding to an order of the outgoing lines from the buffer memory, by using the same number of access intervals as the number of outgoing lines, and to control the buffer memory, the incoming line space switch and the outgoing line space switch so as to write a cell in one of the plurality of buffer memories during access intervals other than an access interval in which a cell is read from the one of the plurality of buffer memories.

8. The cell switching apparatus of claim 1, wherein the buffer memory includes a memory device having a plurality of access ports.

9. The cell switching apparatus of claim 1, wherein the buffer controller includes an access controller for dividing the one predetermined cell time into a plurality of access intervals and for accessing a plurality of cells during each of the plurality of access intervals.

10. The cell switching apparatus of claim 9, wherein the access controller further includes:

a writing-buffer selective circuit for selecting a buffer memory from the plurality of buffer memories in which to write the cell coming from the incoming lines;

a read-out-buffer selective circuit for reading out the cell to be output to one of the plurality of outgoing lines; and, a schedule controller for scheduling the write of the writing buffer selective circuit and the read out of the read out buffer selective circuit.

11. The cell switching apparatus of claim 10, wherein the schedule controller includes:

a score table arranged in a first dimension indicative of the number of buffer memories and a second dimension indicative of the number of access intervals; and, a scheduler for scheduling access to each buffer memory of the plurality of buffer memories during each of the plurality of access intervals by using the score table.

12. The cell switching apparatus of claim 11, wherein the score table is a single score table which schedules both of the reading out and the writing.

13. The cell switching apparatus of claim 12, wherein the scheduler is structured and arranged to first allocate, in the score table, the read out of cells and subsequently allocate, in the score table, the writing of cells.

14. The cell switching apparatus of claim 13, wherein the scheduler is structured and arranged to allocate one read-out operation of a cell and a plurality of writing operations of cells during each of the plurality of access intervals.

15. The cell switching apparatus of claim 12, wherein the scheduler is structured and arranged to divide the plurality of access intervals into read-out-access intervals and writing-access intervals.

16. The cell switching apparatus of claim 11, wherein the score table includes a plurality of score tables, and wherein each of the plurality of score tables is one of a read-out score table for scheduling read out or a write score table for scheduling writing.

17. A cell switching system comprising:

a plurality of cell switching apparatus of claim 1, arranged in parallel, and a plurality of input lines respectively connected to the incoming lines of each of the plurality of cell switching apparatus.

18. The cell switching system of claim 17, wherein the number of input lines is not greater than a multiplication product of one less than the number of buffer memories of each cell switching apparatus and the number of outgoing lines of each cell switching apparatus.

19. A cell switching method for a cell switching apparatus, wherein the cell switching apparatus receives. and transmits cells during a predefined one cell time, divides the predetermined cell time into a plurality of access intervals, and reads out and writes one cell during one of the plurality of access intervals, the method comprising the steps of:

(a) clearing fields of a score table having a first dimension indicative of a number of buffer memories in the cell switching apparatus and a second dimension indicative of a number of access intervals in the predefined one cell time;

(b) allocating one read-out operation of a cell from one of the plurality of buffer memories during each of the plurality of access intervals, the one read-out operation being indicated in corresponding fields of the score table, so that there are remaining unallocated fields of the score table;

(c) allocating writing operations of a plurality of cells to the plurality of buffer memories to the remaining unallocated fields of the score table; and, (d) executing the reading and writing operations allocated on the score table during each of the plurality of access intervals.

20. The cell switching method of claim 19, further comprising the steps of:

allocating a selected buffer memory from the plurality of the buffer memories for writing a received cell; and selecting one of the plurality of access intervals to be used for writing based upon the one read-out operation of the cell allocated for each of the plurality of access intervals during the step (b) of allocating, performed between the step (b) of allocating one reading out operation and the step (c) of allocating writing operations.

21. A method for performing a plurality of read accesses and a plurality of write accesses to a plurality of buffer memories during a predefined cell time so that a read accesses to one buffer memory of the plurality of buffer memories do not occur simultaneously with a write access to the one buffer memory, the method comprising the steps of:

dividing the predefined cell time into a plurality of access times so that each of the plurality of buffer memories may be accessed during each of the plurality of access times;

performing one first read access to one of the plurality of buffer memories and at least one write access to at least one other of the plurality of buffer memories during a first access time of the plurality of access times;

performing one second read access to one of the plurality of buffer memories during a second access time of the plurality of access times; and when any of the plurality of write accesses remain after the first access time, performing at least one of the remaining write accesses to at least one other of the plurality of buffer memories during the second access time.

22. The method of claim 21, the method being performed in a switching apparatus that includes a plurality of output lines, and wherein the step of dividing includes dividing the predefined cell time into a plurality of access times that respectively corresponds to the plurality of output lines.

23. The method of claim 21, wherein the step of dividing further includes the step of providing a score table having a first dimension having coordinates corresponding to a number of access times in the plurality of access times, and a second dimension having coordinates corresponding to a number of buffer memories in the plurality of buffer memories.

24. The method of claim 23, further including the steps, performed after the step of dividing, of:

allocating one read of the plurality of reads to each of the coordinates of the first dimension, the one read of each coordinate of the first dimension corresponding to one of the plurality of buffer memories, so that there are unallocated fields in each of the coordinates of the first dimension; and allocating writes of the plurality of writes to the remaining fields of each of the coordinates of the first dimension;

and wherein the steps of performing are performed according to the score table.

* * * * *